US012218407B2

(12) United States Patent
Lee et al.

(10) Patent No.: US 12,218,407 B2
(45) Date of Patent: Feb. 4, 2025

(54) ANTENNA MODULE AND DEVICE INCLUDING SAME

(71) Applicant: Samsung Electronics Co., Ltd., Suwon-si (KR)

(72) Inventors: Juneseok Lee, Suwon-si (KR); Youngsub Kim, Suwon-si (KR); Sanghoon Park, Suwon-si (KR); Jungho Park, Suwon-si (KR); Kwanghyun Baek, Suwon-si (KR); Youngju Lee, Suwon-si (KR); Jungyub Lee, Suwon-si (KR); Dohyuk Ha, Suwon-si (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 17/946,688

(22) Filed: Sep. 16, 2022

(65) Prior Publication Data

US 2023/0019144 A1 Jan. 19, 2023

Related U.S. Application Data

(63) Continuation of application No. PCT/KR2022/001997, filed on Feb. 9, 2022.

(30) Foreign Application Priority Data

Feb. 9, 2021 (KR) ........................ 10-2021-0018632

(51) Int. Cl.
*H01Q 1/22* (2006.01)
*H01Q 1/24* (2006.01)
*H01Q 1/38* (2006.01)

(52) U.S. Cl.
CPC ........... *H01Q 1/2208* (2013.01); *H01Q 1/243* (2013.01); *H01Q 1/246* (2013.01); *H01Q 1/38* (2013.01)

(58) Field of Classification Search
CPC .... H01Q 1/2283; H01Q 21/065; H01L 23/66; H01L 2223/6677
See application file for complete search history.

(56) References Cited

U.S. PATENT DOCUMENTS 7,675,465 B2 * 3/2010 Doan .................. H01Q 1/2283 343/700 MS
9,620,464 B2 * 4/2017 Baks .................... H01Q 9/0457
(Continued)

FOREIGN PATENT DOCUMENTS

JP 2018-93491 A 6/2018
JP 2020174114 A 10/2020
(Continued)

OTHER PUBLICATIONS

Extended European Search Report dated May 21, 2024, issued in European Patent Application No. 22752988.0.

*Primary Examiner* — Hasan Islam
(74) *Attorney, Agent, or Firm* — Jefferson IP Law, LLP

(57) ABSTRACT

The disclosure relates to a pre-5$^{th}$-Generation (5G) or 5G communication system for supporting higher data rates Beyond 4$^{th}$-Generation (4G) communication system, such as long term evolution (LTE). An antenna device is provided. The antenna device includes a first printed circuit board (PCB), a second PCB for a plurality of antenna elements, and a radio frequency integrated circuit (RFIC) coupled through a first surface of the first PCB. The second PCB may include a radio frequency (RF) routing layer including RF lines for the respective plurality of antenna elements. The first PCB may include a feeding structure for connecting the RF routing layer and the RFIC. The second PCB may be (Continued)

electrically connected to a second surface of the first PCB opposite to the first surface of the first PCB, through a first surface of the second PCB. The second PCB may be coupled to the plurality of antenna elements.

19 Claims, 17 Drawing Sheets

(56) References Cited

U.S. PATENT DOCUMENTS

| | | | | |
|---|---|---|---|---|
| 10,056,922 | B1 * | 8/2018 | Tsvelykh | H01P 1/20 |
| 10,297,927 | B2 | 5/2019 | Amadjikpe | |
| 10,594,019 | B2 | 3/2020 | Baks et al. | |
| 10,594,355 | B2 | 3/2020 | Young | |
| 11,189,905 | B2 * | 11/2021 | Gu | H01L 23/5389 |
| 11,309,621 | B2 | 4/2022 | Baek et al. | |
| 2013/0076570 | A1 | 3/2013 | Lee et al. | |
| 2015/0325925 | A1 * | 11/2015 | Kamgaing | H01L 21/4853 343/893 |
| 2018/0159203 | A1 | 6/2018 | Baks et al. | |
| 2018/0342788 | A1 * | 11/2018 | Lasiter | H01L 21/02518 |
| 2019/0280368 | A1 | 9/2019 | Khan et al. | |
| 2019/0319338 | A1 | 10/2019 | Gu et al. | |
| 2020/0006846 | A1 | 1/2020 | Lasiter et al. | |
| 2020/0052368 | A1 | 2/2020 | Xia et al. | |
| 2020/0185299 | A1 * | 6/2020 | Chang | H01L 23/13 |
| 2020/0266519 | A1 | 8/2020 | Lee et al. | |
| 2020/0279829 | A1 * | 9/2020 | Elsherbini | H01L 25/16 |
| 2020/0321711 | A1 | 10/2020 | Baek et al. | |
| 2020/0367359 | A1 | 11/2020 | Baek et al. | |
| 2020/0395660 | A1 | 12/2020 | Kuroda et al. | |
| 2020/0412021 | A1 | 12/2020 | Chang et al. | |

FOREIGN PATENT DOCUMENTS

| | | | |
|---|---|---|---|
| JP | 2021057705 | A | 4/2021 |
| KR | 10-2020-0097620 | A | 8/2020 |
| KR | 10-2020-0101814 | A | 8/2020 |
| KR | 10-2020-0120352 | A | 10/2020 |

* cited by examiner

ANTENNA MODULE AND DEVICE INCLUDING SAME

CROSS-REFERENCE TO RELATED APPLICATION(S)

This application is a continuation application, claiming priority under § 365(c), of an International application No. PCT/KR2022/001997, filed on Feb. 9, 2022, which is based on and claims the benefit of a Korean patent application number 10-2021-0018632, filed on Feb. 9, 2021, in the Korean Intellectual Property Office, the disclosure of which is incorporated by reference herein in its entirety.

TECHNICAL FIELD

The disclosure relates to a wireless communication system. More particularly, the disclosure relates to an antenna module and a device including the same in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To transmit and/or receive a signal of a mmWave band in a wireless communication system, an electronic device transmitting and/or receiving the signal of the millimeter wave (mmWave) band includes a plurality of antenna elements, a plurality of radio frequency (RF) components (e.g., radio frequency integrated circuits (RFICs)), and a printed circuit board (PCB) for connecting the plurality of RF components. To increase the degree of integration of the electronic device, the PCB consists of a plurality of layers or lamination. For example, a hybrid process board using a high density interconnection (HDI), which is a high density multilayer substrate used in a small electronic device, and a multi-layer board (MLB) including a plurality of printed circuit boards (PCBs) are used. However, this structure has a disadvantage in that the efficiency of the PCB is reduced, a production cost is high, and a design change is not free.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a structure of an antenna device including a detached printed circuit board (PCB) structure in a wireless communication system.

Another aspect of the disclosure is to improve the efficiency of transmission by minimizing a transmission loss of a radio frequency (RF) signal through a structure of an antenna device including a detached PCB structure in a wireless communication system.

Another aspect of the disclosure is to provide a structure capable of increasing the degree of freedom in a design of a PCB connected to an antenna radiator through a structure of an antenna device including a detached PCB structure in a wireless communication system.

Another aspect of the disclosure is to provide a structure capable of minimizing a production cost, and when changing, easily changing some components of an antenna device, through a structure of the antenna device including a detached PCB structure in a wireless communication system.

Additional aspects will be set forth in part in the description which follows and, in part, will be apparent from the description, or may be learned by practice of the presented embodiments.

Solution to Problem

In accordance with an aspect of the disclosure, an antenna device is provided. The antenna device includes a first printed circuit board (PCB), a second PCB for a plurality of antenna elements, and a radio frequency integrated circuit (RFIC) coupled through a first surface of the first PCB. The second PCB may include an RF routing layer including RF lines for the respective plurality of antenna elements. The first PCB may include a feeding structure for connecting the RF routing layer and the RFIC. The second PCB may be electrically connected to a second surface of the first PCB opposite to the first surface of the first PCB, through a first surface of the second PCB. The second PCB may be coupled to the plurality of antenna elements through a second surface of the second PCB opposite the first surface of the second PCB.

In accordance with another aspect of the disclosure, a base station is provided. The base station includes a plurality of antenna arrays, a plurality of radio frequency integrated circuits (RFICs) corresponding to the plurality of antenna arrays, and a plurality of antenna devices connecting the plurality of antenna arrays and the plurality of RFICs. At least one antenna device among the plurality of antenna devices may include a first printed circuit board (PCB), a second PCB for a plurality of antenna elements, and a first RFIC coupled through a first surface of the first PCB. The second PCB may include an RF routing layer including RF lines for the respective plurality of antenna elements. The first PCB may include a feeding structure for connecting the RF routing layer and the RFIC. The second PCB may be electrically connected to a second surface of the first PCB opposite to the first surface of the first PCB, through a first surface of the second PCB. The second PCB may be coupled to the plurality of antenna elements through a second surface of the second PCB opposite to the first surface of the second PCB. The plurality of antenna elements may be included in a first antenna array among the plurality of antenna arrays. The first RFIC may be included in the plurality of RFICs.

Advantageous Effects of Invention

A device of various embodiments of the disclosure may minimize a transmission loss of a radio frequency (RF) signal and increase a transmission efficiency, through a detachable structure of a printed circuit board (PCB) connecting a plurality of antenna elements and a plurality of radio frequency integrated circuits (RFICs).

A device of various embodiments of the disclosure may increase the degree of freedom in a design of a PCB connected to a radiator of an antenna element by a detachable structure of the PCB.

A device of various embodiments of the disclosure may reduce the number of lamination by a detachable structure of a PCB and thus, may minimize a production cost of the PCB and an antenna device.

A device of various embodiments of the disclosure may configure an antenna element and a PCB connected to the antenna element, as one module, by a detachable structure of the PCB, and may be designed to facilitate design change or change resulting from a failure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

Figure 1:
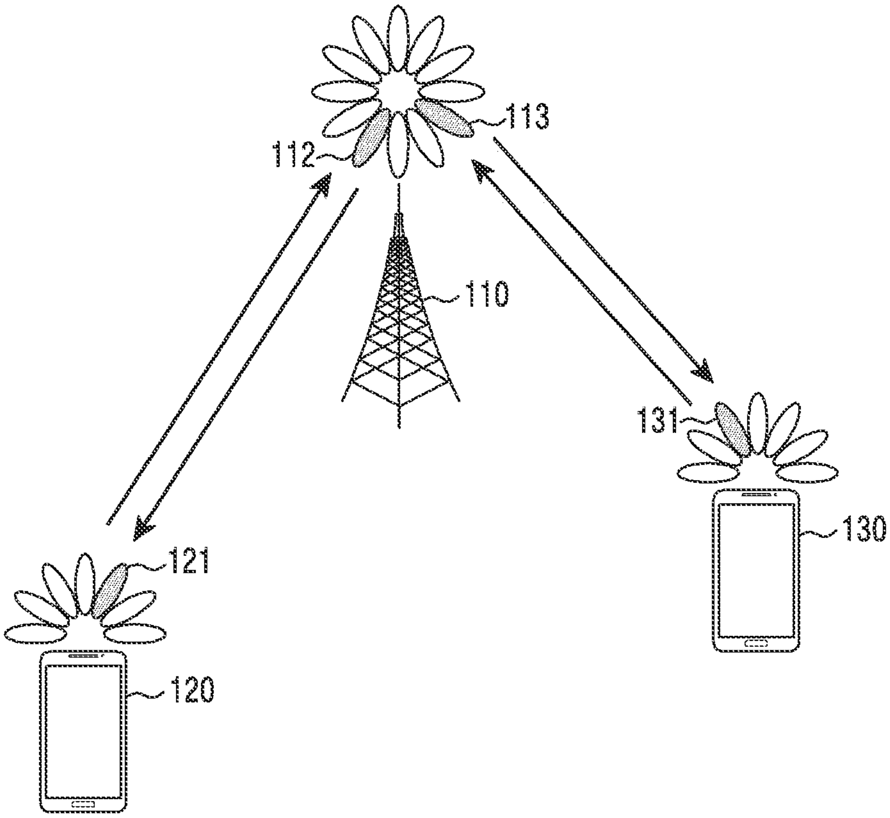
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Terms used in the disclosure are ones used just to explain a specific embodiment of the disclosure, and may not intend to limit the scope of another embodiment. The expression of a singular form may include the expression of a plural form unless otherwise dictating clearly in context. The terms used herein including the technological or scientific terms may have the same meanings as those generally understood by a person having ordinary skill in the art mentioned in the disclosure. Of the terms used in the disclosure, terms defined in a general dictionary may be interpreted as the same or similar meanings as the contextual meanings of a related technology, and are not interpreted as ideal or excessively formal meanings unless defined clearly in the disclosure. According to cases, even the terms defined in the disclosure may not be construed as excluding embodiments of the disclosure.

In various embodiments of the disclosure described below, a hardware access method is explained as an example. However, various embodiments of the disclosure include a technology which uses all of hardware and software, so various embodiments of the disclosure do not exclude a software-based access method.

Terms (e.g., a board structure, a substrate, a print circuit board (PCB), a flexible PCB (FPCB), a module, an antenna, an antenna device, a circuit, a processor, a chip, a component, and a device) referring to parts of electronic devices used in the following description, terms (e.g., a structure body, a structure, a support unit, a contact unit, a protrusion unit, and an opening unit) referring to the shapes of the parts, and terms (e.g., a connecting line, a feeding line, a connecting unit, a contact unit, a feeding unit, a support unit, a contact structure body, a conductive member, and an assembly) referring to connection units between structure bodies, or terms (e.g., a PCB, an FPCB, a signal line, a feeding line, a data line, an RF signal line, an antenna line, an RF path, an RF module, and an RF circuit) referring to a circuit and the like are exemplified for description convenience's sake. Accordingly, the disclosure is not limited to the terms described later, and other terms having equivalent technological meanings may be used. In addition, terms, such as '. . . unit', '. . . machine', '. . . thing', and '. . . body' used hereinafter may mean at least one shape structure or mean a unit for processing a function.

In an antenna device using a signal of an mmWave band, the antenna device may include a radio frequency integrated circuit (RFIC) and a plurality of antenna elements in order to process the signal. In this case, the signal processed by the RFIC may be forwarded to each antenna element through a printed circuit board (PCB). However, when the mmWave signal is used, since a plurality of devices must be mounted on the PCB, the number of lamination of the PCB increases, and as the number of lamination of the PCB increases, a transmission efficiency of an RF signal forwarded from the RFIC to each antenna element decreases. In addition, as the number of lamination of the PCB increases, PCB design and change are restricted, and a production cost of the PCB increases. Hereinafter, in the disclosure, a PCB connecting an RFIC and a plurality of antenna elements is separated into a PCB (e.g., an antenna PCB) coupled with the plurality of antenna elements and a PCB (e.g., a main PCB) coupled with the RFIC (hereinafter, a detachable PCB structure), whereby the plurality of antenna elements and the antenna PCB may be formed as one antenna module. Accordingly to this, the disclosure may separate into the main PCB (e.g., ten layers) and the antenna PCB (e.g., four layers) rather than laminating a large number of layers on one PCB (e.g., eighteen layers), thereby improving a transmission efficiency of an RF signal transmitted from the main PCB, and may improve the radiation efficiency of the RF signal radiated from each antenna element. In addition, according to the disclosure, since the antenna PCB may be configured in the form of a small number of lamination, the degree of freedom in design may be increased, and the antenna PCB may be efficiently replaced even when being replaced according to a failure of some antenna elements or design change. Moreover, when a PCB having the form of a plurality of lamination laminates one more layer, a production cost may increase exponentially. So, the antenna device of an embodiment of the disclosure may separate one PCB into two PCBs, thereby reducing the production cost.

However, the structure of the disclosure is not limited thereto. For example, the antenna device of an embodiment of the disclosure may include one main PCB and a plurality of antenna PCBs. For another example, the antenna device of an embodiment of the disclosure may further include an additional PCB coupled to the antenna PCB in order to more increase the radiation performance of an antenna element. For further example, when there are a plurality of antenna arrays including a plurality of antenna elements, the antenna device of an embodiment of the disclosure may include RFICs corresponding to the respective antenna arrays, and antenna PCBs. Hereinafter, for description convenience's sake, a description will be made with a criterion of an antenna device which includes a plurality of antenna elements, one RFIC, one main PCB, and one antenna PCB.

FIG. 1 illustrates a wireless communication system according to an embodiment of the disclosure.

Referring to FIG. 1, it exemplifies a base station 110, a terminal 120, and a terminal 130, as some of nodes using a wireless channel in the wireless communication system. FIG. 1 illustrates only one base station, but other base stations that are the same as or similar to the base station 110 may be further included.

The base station 110 is a network infrastructure that presents wireless access to the terminals 120 and 130. The base station 110 has coverage that is defined as a certain geographic region, based on a distance capable of transmitting a signal. The base station 110, in addition to the base station, may be referred to as an 'access point (AP)', an 'eNodeB (eNB)', a '$5^{th}$-generation node (5G node)', a 'wireless point', a 'transmission/reception point (TRP)' or other terms having an equivalent technical meaning.

Each of the terminal 120 and the terminal 130 is a device used by a user, and performs communication with the base station 110 through a wireless channel. In some cases, at least one of the terminal 120 and the terminal 130 may be operated without user's participation. For example, at least one of the terminal 120 and the terminal 130 is a device that performs machine type communication (MTC), and may not be carried by a user. Each of the terminal 120 and the terminal 130, in addition to the terminal, may be referred to as a 'user equipment (UE)', a 'mobile station', a 'subscriber station', a 'customer premises device (CPE)', a 'remote terminal', a 'wireless terminal', an 'electronic device', a 'user device', or other terms having equivalent technical meaning.

The base station 110, the terminal 120, and the terminal 130 may transmit and receive a wireless signal in millimeter wave (mmWave) bands (e.g., 28 GHz, 30 GHz, 38 GHz, and 60 GHz). In this case, in order to improve a channel gain, the base station 110, the terminal 120, and the terminal 130 may perform beamforming Here, the beamforming may include transmission beamforming and reception beamforming. For example, the base station 110, the terminal 120, and the terminal 130 may impart directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relationship with a resource having transmitted the serving beams 112, 113, 121, and 131.

A structure of the antenna device of an embodiment of the disclosure may be used in an electronic device transmitting or receiving a signal of an mmWave band. For example, when the base station 110 of FIG. 1 transmits or receives a signal of the mmWave band, an antenna array including a plurality of antenna elements of the base station 110, an RFIC, and a PCB connecting the antenna array and the RFIC may be formed into the structure of the antenna device of an embodiment of the disclosure.

Hereinafter, in FIG. 2, a part of the base station 110 of FIG. 1 including the antenna device of an embodiment of the disclosure will be described as an example.

Figure 2:
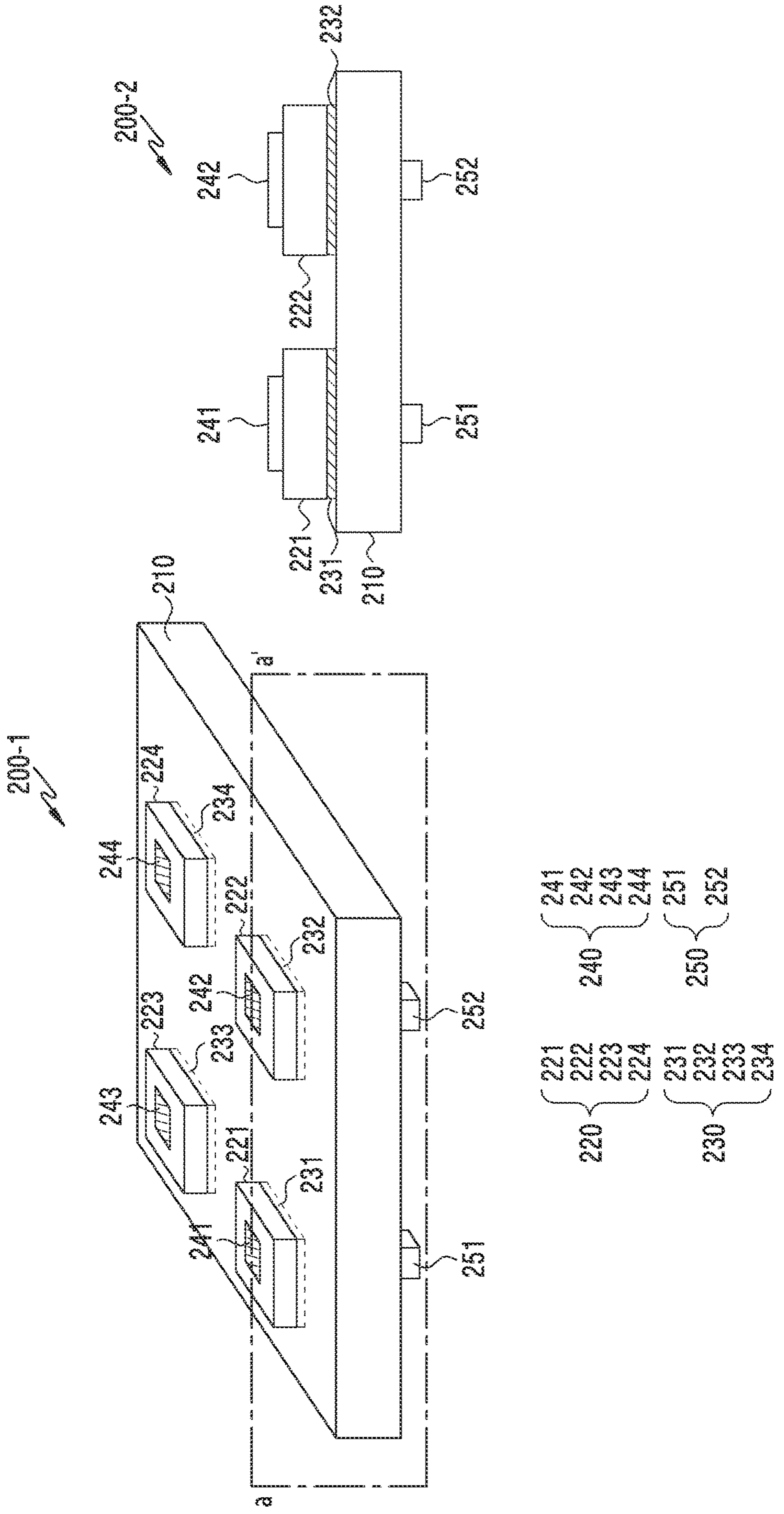
FIG. 2 illustrates an electronic device including an antenna device according to an embodiment of the disclosure.

FIG. 2 illustrates an electronic device including an antenna device according to an embodiment of the disclosure.

Referring to FIG. 2, the left drawing illustrates a perspective view of an electronic device 200-1 (e.g., a part of the base station 110 of FIG. 1) including the antenna device according to an embodiment of the disclosure, and the right drawing illustrates a perspective view of an electronic device 200-2 viewed laterally from a cross-section taken along line a-a' in the electronic device 200-1. For description convenience's sake, four radio frequency integrated circuits (RFICs), one first printed circuit board (PCB), four second PCBs, and four antenna arrays are illustrated in FIG. 2. However, the disclosure is not limited thereto. For example, one antenna array may be connected to two RFICs. For another example, it may include more second PCBs or fewer second PCBs than four second PCBs. For further example, the arrangement of the four second PCBs may be formed in the form of 1×4 or 4×1 instead of the form of 2×2. In addition, in FIG. 2, four antenna arrays are disposed to be spaced apart from each other by a predetermined interval, but the disclosure is not limited thereto.

Referring to the left drawing of FIG. 2, the electronic device 200-1 includes one first printed circuit board (PCB), four second PCBs 220, four antenna arrays 240, and four radio frequency integrated circuits (RFICs) 250. However, the electronic device 200-1, a perspective view viewed from one side, illustrates only the RFIC 251 and the RFIC 252 each corresponding to the second PCB 221 and the second PCB 222 among the four RFICs 250, but this does not mean two RFICs but may mean RFICs corresponding to respective second PCBs, and it may be understood that the electronic device 200-1 includes four RFICs.

According to an embodiment of the disclosure, the first PCB 210 may mean one substrate. In other words, the first PCB 210 may mean one substrate to which RF components included in the electronic device 200-1 are coupled. In this case, the first PCB 210 may be referred to as a main PCB, a main board, or a mother board. According to an embodiment of the disclosure, the first PCB 210 may include a plurality of layers. The first PCB 210 may be formed of a plurality of layers, and RF components or a feeding structure may be disposed on each layer. According to an embodiment of the disclosure, the first PCB 210 may be coupled to the RFIC 250. For example, the first PCB 210 may be coupled to four RFICs 250 (e.g., an RFIC 251, an RFIC 252, and two RFICs (not shown)). In this case, the first PCB 210 may be coupled to the RFIC 250 through a first surface of the first PCB 210. In addition, the RFIC 250 coupled to the first PCB 210 may be disposed to correspond to the second PCB 220. According to an embodiment of the disclosure, the first PCB 210 may be connected to the second PCB 220 through a connection unit 230. For example, the first PCB 210 may be electrically connected to the four second PCBs 221, 222, 223 and 224 through four connection units 231, 232, 233, and 234. In this case, the first PCB 210 may be coupled to the connection unit 230 through a second surface of the first PCB 210. For example, the first PCB 210 may be formed into a structure separated from the second PCB 220. Here, the first surface and second surface of the first PCB 210 may mean mutually opposite surfaces.

According to an embodiment of the disclosure, the second PCB 220 may mean one substrate. In other words, the second PCB 220 may refer to one substrate to which RF components included in the electronic device 200-1 are coupled. In this case, the second PCB 220 may be referred to as a radio frequency PCB (RF PCB), an antenna PCB, an RF board, or an antenna board. According to an embodiment of the disclosure, the second PCB 220 may include a plurality of layers. The second PCB 220 may be formed of the plurality of layers, and an RF component or a feeding structure may be disposed on each layer. For example, as described later, the second PCB 220 may include an RF routing layer for transmitting an RF signal processed by the RFIC 250 to a plurality of antenna elements. According to an embodiment of the disclosure, the plurality of second PCBs 220 may be connected to the first PCB 210 through a plurality of connection units 230. For example, the four second PCBs 221, 222, 223, and 224 of the electronic device 200-1 of FIG. 2 may be electrically connected to the PCB 210 through the plurality of connection units 231, 232, 233, and 234 each corresponding to thereto. In this case, the second PCB 220 may be coupled to the connection unit 230 through a first surface of the second PCB 220. According to an embodiment of the disclosure, the plurality of second PCBs 220 may be connected to a plurality of antenna arrays 240 each corresponding to thereto. The plurality of second PCBs 220 may be coupled to the plurality of antenna arrays 240 through second surfaces of the second PCBs 220 each corresponding thereto. The plurality of second PCBs 220 may receive an RF signal processed by the RFIC 250 through the first PCB 210, and may transmit the RF signal to the plurality of antenna arrays 240. In other words, the plurality of second PCBs 220 may include an RF routing layer for forwarding an RF signal received from the first PCB 210 to the plurality of antenna arrays 240. Here, the first surface and second surface of the second PCB 220 may mean mutually opposite surfaces.

According to one embodiment of the disclosure, the plurality of connection units 230 may be disposed between the second surface of the first PCB 210 and the first surfaces of the second PCBs 220 in order to electrically connect the first PCB 210 and the plurality of second PCBs 220. In addition, the connection units 230 each may be disposed to correspond to the second PCBs 220. For example, the plurality of connection units 231, 232, 233, and 234 each may be disposed to correspond to the plurality of second PCBs 221, 222, 223 and 224. According to an embodiment of the disclosure, the connection unit 230 may be formed to have the same area as the second PCB 220. However, the disclosure is not limited thereto, and the area of the connection unit 230 may be determined based on a coupling method or material, or the like, of the connection unit 230. For example, the connection unit 230 may be formed to have a smaller area than the second PCB 220. For another example, the connection unit 230 may be formed to have a larger area than the second PCB 220.

According to an embodiment of the disclosure, the plurality of antenna arrays 240 may be disposed to correspond to the plurality of second PCBs 220. For example, the antenna arrays 241, 242, 243, and 244 may be arranged to have a 2×2 array structure correspondingly to the second PCBs 221, 222, 223 and 224, respectively. For example, the electronic device 200-1 may include the four antenna arrays 241, 242, 243, and 244. However, the disclosure is not limited thereto. For example, the electronic device 200-1 may include two antenna arrays formed into a 2×1 array structure or a 1×2 array structure. According to an embodiment of the disclosure, the antenna array 240 may include a plurality of antenna elements. For example, one antenna array 240 may include 256 antenna elements, and the 256 antenna elements may be arranged to have a 16×16 array structure. However, the disclosure is not limited thereto. For example, one antenna array 240 may include more or fewer antenna elements than the 256 antenna elements. For another example, the antenna array 240 may include a plurality of sub-arrays, and may be formed into a structure in which each sub-array includes a plurality of antenna elements. For further example, the antenna array 240 may not be arranged to have a 16×16 array structure, but may be arranged to have an array (e.g., 32×8, 64×4, or the like)

having different horizontal and vertical numbers. In other words, it is only meant that the antenna array 240 of FIG. 2 may include the plurality of antenna elements, and it is obvious that the arrangement, structure, or number of the antenna array 240 is not limited.

Referring to the right drawing of FIG. 2, the electronic device 200-2 may include one first PCB 210, two second PCBs 221 and 222, two connection units 231 and 232, two antenna arrays 241 and 242, and two RFICs 251 and 252. As described above, the electronic device 200-2 shows a part (i.e., a cross-section taken along line a-a') of the electronic device 200-1. According to an embodiment of the disclosure, in the electronic device 200-2, the RFICs 251 and 252 may be disposed on the first surface of the first PCB 210, and the connection units 231 and 232 may be disposed on the second surface of the first PCB 210. In the electronic device 200-2, the connection unit 231 may be disposed on the first surface of the second PCB 221, and the antenna array 241 may be disposed on the second surface of the second PCB 221. In addition, in the electronic device 200-2, the connection unit 232 may be disposed on the first surface of the second PCB 222, and the antenna array 242 may be disposed on the second surface of the second PCB 222. In other words, the second PCB, the connection unit, the RFIC, and the antenna array each may be disposed to correspond thereto. However, the disclosure is not limited thereto. For example, as described later, two RFICs may be disposed in one antenna array. For another example, two or more second PCBs may be disposed in one antenna array.

As described above, a device of an embodiment of the disclosure includes a structure (hereinafter, a detachable PCB structure) separating a PCB disposed between an antenna (e.g., an antenna array, a sub-array, an antenna element, or the like) and an RFIC, into a PCB connected to the antenna and a PCB connected to the RFIC. Hereinafter, a description will be made with a criterion of an antenna device including the detachable PCB structure described in FIG. 2.

FIGS. 3A, 3B, 3C, 3D, 3E, 3F, and 3G illustrate structure of antenna devices according to various embodiments of the disclosure.

Referring to FIGS. 3A, 3B, 3C, 3D, 3E, 3F, and 3G, antenna devices 300*a* to 300*g* are illustrated, but these are merely divided for description convenience's sake, and the disclosure is not limited thereto. In addition, in the antenna devices 300*a* to 300*g*, the width of each component is an example shown for description convenience's sake, and an actual width may be different. For example, as illustrated in FIG. 2, one first PCB may be formed to have a larger area (i.e., a width in FIGS. 3A, 3B, 3C, 3D, 3E, 3F, and 3G) than one second PCB.

Figure 3A:
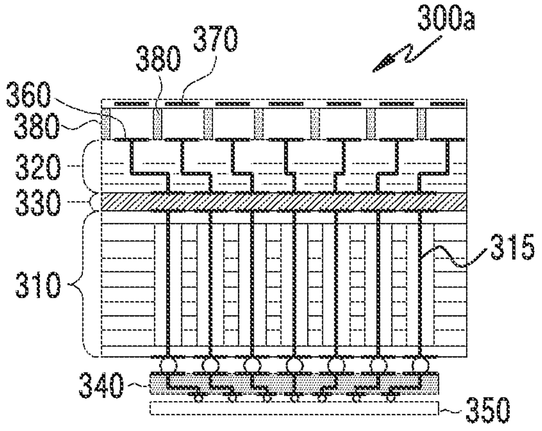
FIGS. 3A, 3B, 3C, 3D, 3E, 3F, and 3G illustrate structures of antenna devices according to various embodiments of the disclosure.

Referring to the antenna device 300*a* of FIG. 3A, the antenna device 300*a* may include a first printed circuit board (PCB) 310, a second PCB 320, a connection unit 330, a package board (PKG) 340, a radio frequency integrated circuit (RFIC) 350, a first conductive member 360, a second conductive member 370, and a support structure 380.

According to an embodiment of the disclosure, the first PCB 310 may be disposed between the connection unit 330 and the PKG 340. At this time, the first PCB 310 may be connected to the PKG 340 on a first surface of the first PCB 310 by seven ball grid arrays (BGAs), and the connection unit 330 may be disposed on a second surface of the first PCB 310. Here, the first surface of the first PCB 310 may mean a surface opposite to the second surface. In the antenna device 300*a*, the coupling of the first PCB 310 with the PKG 340 by the seven BGAs is exemplary, and the disclosure is not limited thereto. For example, the first PCB 310 may be coupled to the PKG 340 by more or fewer than the seven BGAs, and may be coupled by other coupling schemes (e.g., a pin grid array (PGA) or a land grid array (LGA), or the like).

According to an embodiment of the disclosure, the first PCB 310 may be formed of a plurality of layers. For example, the first PCB 310 of the antenna device 300*a* may be formed of ten layers. The first PCB 310 may include a feeding structure 315. For example, the feeding structure 315 of the first PCB 310 may include seven feeding lines. In this case, the feeding lines may mean a path for forwarding a radio frequency (RF) signal processed by the RFIC 350. According to an embodiment of the disclosure, the feeding structure 315 may be formed to connect the second surface of the first PCB 310 from the first surface of the first PCB 310. In this case, the feeding lines of the feeding structure 315 may be formed into a structure for maximizing a transmission efficiency by minimizing a transmission loss. For example, the feeding structure 315 may be formed into a structure vertically connecting from the first surface of the first PCB 310 to the second surface. According to an embodiment of the disclosure, the feeding lines of the feeding structure 315 may be formed to pass through holes formed in the plurality of layers inside the first PCB 310. For example, the feeding lines of the feeding structure 315 may be formed of a coaxial plating through hole (PTH). In the antenna device 300*a*, the feeding structure 315 is illustrated to include seven feeding lines, but the disclosure is not limited thereto, and a structure of the feeding structure 315 may be determined based on the plurality of antenna elements connected to the antenna device 300*a*. For example, the feeding structure 315 may include fewer or more than the seven feeding lines.

According to an embodiment of the disclosure, the first PCB 310 may forward an RF signal processed by the RFIC 350, to the second PCB 320. The RF signal processed by the RFIC 350 may be forwarded to the second PCB 320 through the feeding structure 315 included in the first PCB 310. For example, here, the feeding may include forwarding a signal as well as supplying a power source.

According to an embodiment of the disclosure, the second PCB 320 may be disposed between the connection unit 330 and the plurality of antenna elements. In this case, the second PCB 320 may be connected to the plurality of antenna elements on the second surface, and the connection unit 330 may be disposed on the first surface of the second PCB 320. Here, the first surface of the second PCB 320 may mean a surface opposite to the second surface. In the antenna device 300*a*, the coupling of the second PCB 320 with seven antenna elements is exemplary, and the disclosure is not limited thereto. For example, as described in FIG. 2, the second PCB 320 may be connected to 256 antenna elements formed into a 16×16 array structure. As described later, the antenna element may mean one first conductive member 360, a part of the support structure 380, and one second conductive member 370, or may mean one first conductive member 360.

According to an embodiment of the disclosure, the second PCB 320 may be formed of a plurality of layers. For example, the second PCB 320 of the antenna device 300*a* may be formed of three layers. According to an embodiment of the disclosure, the second PCB 320 may include an RF routing layer. For example, at least one of the plurality of layers of the second PCB 320 may refer to the RF routing layer. The RF routing layer may refer to a part of a feeding line for forwarding, to the antenna element, an RF signal forwarded from the first PCB 310. For example, the RF routing layer may be formed separately from the feeding structure 315 of the first PCB 310. According to one embodiment of the disclosure, the RF routing layer may be formed in a horizontal direction on the first surface and second surface of the second PCB 320. To forward a signal forwarded from the RFIC 350 having a smaller size than those of the first PCB 310 and the second PCB 320 to the plurality of antenna elements widely disposed through the second surface of the second PCB 320, the RF routing layer may be formed in a horizontal direction with the second surface of the second PCB 320, and accordingly to this, the second PCB 320 may receive an RF signal processed by the RFIC 350 from the first PCB 310 and forward to the plurality of antenna elements.

According to an embodiment of the disclosure, the connection unit 330 may be disposed between the first PCB 310 and the second PCB 320 in order to electrically connect the first PCB 310 and the second PCB 320. For example, the connection unit 330 may be disposed between the second surface of the first PCB 310 and the first surface of the second PCB 320. According to an embodiment of the disclosure, the connection unit 330 may be formed of a coupler or a connector. For example, as described later in FIG. 8, the connection unit 330 may be formed into a coupler structure, such as a capacitor. For another example, the connection unit 330 may be formed into a connector structure that is based on at least one scheme among a ball grid array (BGA), a land grid array (LGA), a conductive paste, and a surface mount device (SMD).

According to an embodiment of the disclosure, the connection unit 330 may forward an RF signal from the first PCB 310 to the second PCB 320. The connection unit 330 may forward the RF signal, by electrically connecting the first PCB 310 and the second PCB 320 by a coupler or a connector.

According to an embodiment of the disclosure, the PKG 340 may be disposed between the first PCB 310 and the RFIC 350. For example, the PKG 340 may be coupled through seven BGAs on the first surface of the first PCB 310. However, the disclosure is not limited thereto, and the number of BGAs may be determined based on the number of the plurality of antenna elements of the antenna device 300*a*.

According to an embodiment of the disclosure, the RFIC 350 may be coupled to the PKG 340 through soldering. For example, the RFIC 350 may be coupled to the PKG 340 via seven soldering points. However, the disclosure is not limited thereto, and the number of soldering points may be determined based on the number of the plurality of antenna elements of the antenna device 300*a*. According to an embodiment of the disclosure, the RFIC 350 may include a plurality of RF components for processing an RF signal. For example, the RFIC 350 may include a power amplifier, a mixer, an oscillator, a digital to analog converter (DAC), an analog to digital converter (ADC), and the like. According to an embodiment of the disclosure, the RFIC 350 may process the RF signal in order to transmit or receive a targeted signal in the antenna device 300*a*, and the RF signal processed by the RFIC 350 may be transmitted or received through the PKG 340, the first PCB 310, the connection unit 330, the second PCB 320, and the antenna element.

According to an embodiment of the disclosure, the PKG 340 may refer to a substrate for connecting the RFIC 350 to the first PCB 310. Accordingly, the antenna device 300*a* may include an RFIC chip in which the PKG 340 and the RFIC 350 are formed into one chip. For example, the structure of the antenna device 300*a* of FIG. 3A merely illustrates an example for description convenience, and may refer to other RF devices having substantially the same structure.

According to an embodiment of the disclosure, the antenna device 300*a* may include the plurality of antenna elements. For example, each antenna element may include the first conductive member 360, the second conductive member 370, and the support structure 380. For another example, each antenna element may include only the first conductive member 360. In other words, the construction of the antenna element may vary according to the structure of the antenna element. For example, when the antenna element includes only one patch antenna, the antenna element may include only the first conductive member 360. For another example, when the antenna element includes a double patch antenna, the antenna element may include the first conductive member 360, the second conductive member 370, and the support structures 380 for spacing the two conductive members apart. However, for description convenience's sake, it is assumed that the antenna device 300*a* includes the plurality of antenna elements formed of the first conductive member 360, the second conductive member 370, and the support structure 380.

According to an embodiment of the disclosure, the first conductive member 360 may be disposed on the second PCB 320. For example, the first conductive member 360 may be coupled through the second surface of the second PCB 320. According to another embodiment of the disclosure, the first conductive member 360 may be disposed to be spaced apart from the second PCB 320. For example, as described later in FIG. 5, the first conductive member 360 may be disposed as being spaced apart from the second PCB 320 by the support structure 380. More particularly, the first conductive member 360 may be disposed on a lower surface of an additional PCB which is spaced apart from the second PCB 320 by the support structure 380.

According to an embodiment of the disclosure, the first conductive member 360 may be formed of a patch antenna. The first conductive member 360 may be formed of the patch antenna for radiating an RF signal received from the second PCB 320. In addition, the first conductive member 360 may be formed of a metal material.

According to an embodiment of the disclosure, the first conductive member 360 may be fed directly or indirectly from the second PCB 320. For example, when the first conductive member 360 is disposed on the second surface of the second PCB 320, the first conductive member 360 may be fed directly by the feeding line including the RF routing layer of the second PCB 320. For another example, when the first conductive member 360 is disposed on one surface of the additional PCB spaced apart from the second PCB 320, the first conductive member 360 may be fed indirectly, by a method, such as coupling, from the feeding line of the second PCB 320. Here, the feeding may mean forwarding an RF signal as well as supplying a power source as described above.

According to an embodiment of the disclosure, the second conductive member 370 may be disposed as being spaced apart from the first conductive member 360. For example, when the first conductive member 360 is disposed on the second surface of the second PCB 320, the second conductive member 370 may be disposed inside an additional PCB which is disposed as being spaced apart from the second PCB 320 by the support structure 380, and accordingly to this, may be disposed as being spaced apart from the first conductive member 360. For another example, when the first conductive member 360 is disposed on one surface of the additional PCB spaced apart from the second PCB 320, the second conductive member 370 is disposed on the other surface, not one surface of the additional PCB on which the first conductive member 360 is disposed, whereby the second conductive member 370 may be disposed as being spaced apart from the first conductive member 360.

According to an embodiment of the disclosure, the second conductive member 370 may be formed of a patch antenna. The second conductive member 370 may be formed of the patch antenna for radiating an RF signal received from the second PCB 320. In addition, the second conductive member 370 may be formed of a metal material.

According to an embodiment of the disclosure, the support structure 380 may be disposed on the second surface of the second PCB 320. In addition, the additional PCB may be disposed at one end of the support structure 380 opposite to one end coupled to the second PCB 320. An air layer may be formed between the additional PCB and the second PCB 320 by the support structure 380, and the second PCB 320 may be spaced apart from the additional PCB by the support structure 380. As the first conductive member 360 and the second conductive member 370 are spaced apart from each other by the air layer formed by the support structure 380, an antenna radiation efficiency may be increased. As described later in FIG. 7, the support structure 380 may be formed of a conductive material or a non-conductive material.

According to an embodiment of the disclosure, the additional PCB may be formed based on radiation performance and transmission efficiency. For example, the additional PCB may be formed of a high-end PCB. For another example, the additional PCB may be formed of a flexible PCB (FPCB).

As described above, the antenna device 300*a* may be formed to include seven antenna elements on one second PCB 320. The one second PCB 320 of the antenna device 300*a* and the seven antenna elements may be configured as one antenna module, and the antenna module may be separated from the first PCB 310. Here, each of the antenna elements may be formed of one first conductive member 360, one second conductive member 370, and a part of the support structure 380. In addition, the RF signals processed by the RFIC 350 of the antenna device 300*a* may be forwarded to the second PCB 320 through different paths respectively by seven feeding lines included in the feeding structure 315 of the first PCB 310. Here, the feeding structure 315 of the first PCB 310 may be formed into a structure for minimizing a transmission loss. For example, the feeding structure 315 may be formed into a vertical structure passing through the holes of the plurality of layers of the first PCB 310. The respective RF signals may be forwarded to and radiated from the first conductive member 360 through the different feeding lines including the RF routing layer respectively in the second PCB 320. Here, the RF routing layer of the second PCB 320 may be formed into a horizontal structure with respect to a plurality of layers of the second PCB 320. According to this, the RF routing layer may be electrically connected to a conductive member (i.e., an antenna element) that may be widely disposed on the second PCB 320 or the additional PCB. In the related art, one PCB includes a plurality of laminated structures, and thus a production cost is high, a transmission efficiency is low, and replacement resulting from a design change and a failure of some devices (e.g., antenna elements) is difficult. Unlike this, since a PCB structure of the antenna device 300*a* including a detachable PCB of an embodiment of the disclosure is separated into the first PCB 310 and the second PCB 320, the first PCB 310 may perform vertical RF signal forwarding, and the second PCB 320 may perform relatively horizontal RF signal forwarding. According to this, the production cost may be reduced, and the transmission efficiency may be increased, and the antenna module may be easily replaced even if a design change or a failure of some devices occurs.

Figure 3B:
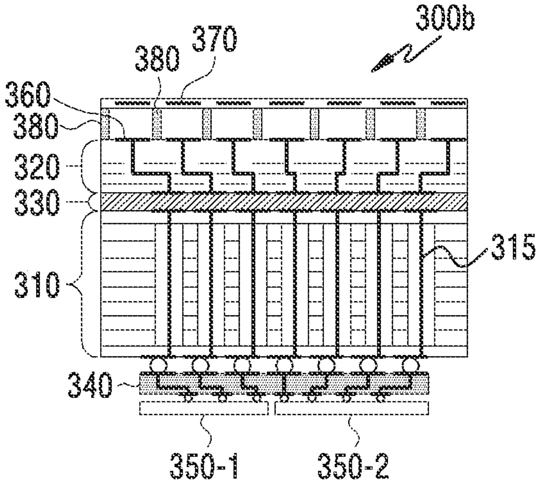

Referring to the antenna device 300*b* of FIG. 3B, the antenna device 300*b* may include a first printed circuit board (PCB) 310, a second PCB 320, a connection unit 330, a package board (PKG) 340, two radio frequency integrated circuits (RFICs) 350-1 and 350-2, a first conductive member 360, a second conductive member 370, and a support structure 380.

According to an embodiment of the disclosure, the first PCB 310 may be disposed between the connection unit 330 and the PKG 340. At this time, the first PCB 310 may be connected to the PKG 340 on a first surface of the first PCB 310 by seven ball grid arrays (BGAs), and the connection unit 330 may be disposed on a second surface of the first PCB 310. Here, the first surface of the first PCB 310 may mean a surface opposite to the second surface. In the antenna device 300*a*, the coupling of the first PCB 310 with the PKG 340 by the seven BGAs is exemplary, and the disclosure is not limited thereto. For example, the first PCB 310 may be coupled to the PKG 340 by more or fewer than the seven BGAs, and may be coupled by other coupling schemes (e.g., a pin grid array (PGA) or a land grid array (LGA), or the like).

According to an embodiment of the disclosure, the first PCB 310 may be formed of a plurality of layers. For example, the first PCB 310 of the antenna device 300*b* may be formed of ten layers. The first PCB 310 may include a feeding structure 315. For example, the feeding structure 315 of the first PCB 310 may include seven feeding lines. In this case, the feeding lines may mean paths for forwarding a radio frequency (RF) signal processed by the RFIC 350. According to an embodiment of the disclosure, the feeding structure 315 may be formed to connect the second surface of the first PCB 310 from the first surface of the first PCB 310. In this case, the feeding lines of the feeding structure 315 may be formed into a structure for maximizing a transmission efficiency by minimizing a transmission loss. For example, the feeding structure 315 may be formed into a structure vertically connecting from the first surface of the first PCB 310 to the second surface. According to an embodiment of the disclosure, the feeding lines of the feeding structure 315 may be formed to pass through holes formed in the plurality of layers inside the first PCB 310. For example, the feeding lines of the feeding structure 315 may be formed of a coaxial plating through hole (PTH). In the antenna device 300*b*, the feeding structure 315 is illustrated to include seven feeding lines, but the disclosure is not limited thereto, and the structure of the feeding structure 315 may be determined based on the plurality of antenna elements connected to the antenna device 300*b*. For example, the feeding structure 315 may include fewer or more than the seven feeding lines.

According to an embodiment of the disclosure, the first PCB 310 may forward an RF signal processed by the RFIC 350, to the second PCB 320. The RF signal processed by the RFICs 350-1 and 350-2 may be forwarded to the second PCB 320 through the feeding structure 315 included in the first PCB 310. For example, here, the feeding may include forwarding a signal as well as supplying a power source.

According to an embodiment of the disclosure, the second PCB 320 may be disposed between the connection unit 330 and the plurality of antenna elements. In this case, the second PCB 320 may be connected to the plurality of antenna elements on the second surface, and the connection unit 330 may be disposed on the first surface of the second PCB 320. Here, the first surface of the second PCB 320 may mean a surface opposite to the second surface. In the antenna device 300*b*, the coupling of the second PCB 320 with seven antenna elements is exemplary, and the disclosure is not limited thereto. For example, as described in FIG. 2, the second PCB 320 may be connected to 256 antenna elements formed into a 16×16 array structure. As described later, the antenna element may mean one first conductive member 360, a part of the support structure 380, and one second conductive member 370, or may mean one first conductive member 360.

According to an embodiment of the disclosure, the second PCB 320 may be formed of a plurality of layers. For example, the second PCB 320 of the antenna device 300*b* may be formed of three layers. According to an embodiment of the disclosure, the second PCB 320 may include an RF routing layer. For example, at least one of the plurality of layers of the second PCB 320 may refer to the RF routing layer. The RF routing layer may refer to a part of a feeding line for forwarding, to the antenna element, an RF signal forwarded from the first PCB 310. For example, the RF routing layer may be formed separately from the feeding structure 315 of the first PCB 310. According to one embodiment of the disclosure, the RF routing layer may be formed in a horizontal direction on the first surface and second surface of the second PCB 320. To forward signals forwarded from the RFICs 350-1 and 350-2 having a smaller size than those of the first PCB 310 and second PCB 320 to the plurality of antenna elements widely disposed through the second surface of the second PCB 320, the RF routing layer may be formed in a horizontal direction with the second surface of the second PCB 320, and accordingly to this, the second PCB 320 may receive the RF signal processed by the RFICs 350-1 and 350-2 from the first PCB 310 and forward to the plurality of antenna elements.

According to an embodiment of the disclosure, the connection unit 330 may be disposed between the first PCB 310 and the second PCB 320 in order to electrically connect the first PCB 310 and the second PCB 320. For example, the connection unit 330 may be disposed between the second surface of the first PCB 310 and the first surface of the second PCB 320. According to an embodiment of the disclosure, the connection unit 330 may be formed of a coupler or a connector. For example, as described later in FIG. 8, the connection unit 330 may be formed into a coupler structure, such as a capacitor. For another example, the connection unit 330 may be formed into a connector structure that is based on at least one scheme among a ball grid array (BGA), a land grid array (LGA), a conductive paste, and a surface mount device (SMD).

According to an embodiment of the disclosure, the connection unit 330 may forward an RF signal from the first PCB 310 to the second PCB 320. The connection unit 330 may forward the RF signal, by electrically connecting the first PCB 310 and the second PCB 320 by a coupler or a connector.

According to an embodiment of the disclosure, the PKG 340 may be disposed between the first PCB 310 and the RFICs 350-1 and 350-2. For example, the PKG 340 may be coupled through seven BGAs on the first surface of the first PCB 310. However, the disclosure is not limited thereto, and the number of BGAs may be determined based on the number of the plurality of antenna elements of the antenna device 300*b*.

According to an embodiment of the disclosure, the RFICs 350-1 and 350-2 may be coupled to the PKG 340 through soldering. For example, the RFIC 350-1 may be coupled to the PKG 340 through three soldering points, and the RFIC 350-2 may be coupled to the PKG 340 through four soldering points. However, the disclosure is not limited thereto, and the number of soldering points may be determined based on the number of the plurality of antenna elements of the antenna device 300*b*. According to an embodiment of the disclosure, the RFICs 350-1 and 350-2 may include a plurality of RF components for processing an RF signal. For example, the RFICs 350-1 and 350-2 may include a power amplifier, a mixer, an oscillator, a digital to analog converter (DAC), an analog to digital converter (ADC), and the like. According to an embodiment of the disclosure, the RFICs 350-1 and 350-2 may process the RF signal in order to transmit or receive a targeted signal in the antenna device 300*b*, and the RF signal processed by the RFICs 350-1 and 350-2 may be transmitted or received through the PKG 340, the first PCB 310, the connection unit 330, the second PCB 320, and the antenna element. In this case, a first RF signal processed by the RFIC 350-1 may be the same as or be different from a second RF signal processed by the RFIC 350-2. In this case, the RF signal processing in the RFIC 350-1 and the RFIC 350-2 may be determined based on a signal intended to be transmitted or received by the antenna device 300*b*.

According to an embodiment of the disclosure, the PKG 340 may refer to a substrate for connecting the RFICs 350-1 and 350-2 to the first PCB 310. Accordingly, the antenna device 300*b* may include an RFIC chip in which the PKG 340 and the RFICs 350-1 and 350-2 are formed into one chip. For example, the structure of the antenna device 300*b* of FIG. 3B merely illustrates an example for description convenience, and may mean other devices having substantially the same structure.

According to an embodiment of the disclosure, the antenna device 300*b* may include the plurality of antenna elements. For example, each antenna element may include the first conductive member 360, the second conductive member 370, and the support structure 380. For another example, each antenna element may include only the first conductive member 360. In other words, the construction of the antenna element may vary according to the structure of the antenna element. For example, when the antenna element includes only one patch antenna, the antenna element may include only the first conductive member 360. For another example, when the antenna element includes a double patch antenna, the antenna element may include the first conductive member 360, the second conductive member 370, and the support structures 380 for spacing the two conductive members apart. However, for description convenience's sake, it is assumed that the antenna device 300*b* includes the plurality of antenna elements formed of the first conductive member 360, the second conductive member 370, and the support structure 380.

According to an embodiment of the disclosure, the first conductive member 360 may be disposed on the second PCB 320. For example, the first conductive member 360 may be coupled through the second surface of the second PCB 320. According to another embodiment of the disclosure, the first conductive member 360 may be disposed to be spaced apart from the second PCB 320. For example, as described later in FIG. 5, the first conductive member 360 may be disposed as being spaced apart from the second PCB 320 by the support structure 380. More particularly, the first conductive member 360 may be disposed on a lower surface of an additional PCB spaced apart from the second PCB 320 by the support structure 380.

According to an embodiment of the disclosure, the first conductive member 360 may be formed of a patch antenna. The first conductive member 360 may be formed of the patch antenna for radiating the RF signal received from the second PCB 320. In addition, the first conductive member 360 may be formed of a metal material.

According to an embodiment of the disclosure, the first conductive member 360 may be fed directly or indirectly from the second PCB 320. For example, when the first conductive member 360 is disposed on the second surface of the second PCB 320, the first conductive member 360 may be fed directly by a feeding line including the RF routing layer of the second PCB 320. For another example, when the first conductive member 360 is disposed on one surface of the additional PCB spaced apart from the second PCB 320, the first conductive member 360 may be fed indirectly, by a method, such as coupling, from the feeding line of the second PCB 320. Here, the feeding may mean forwarding an RF signal as well as supplying a power source as described above.

According to an embodiment of the disclosure, the second conductive member 370 may be disposed as being spaced apart from the first conductive member 360. For example, when the first conductive member 360 is disposed on the second surface of the second PCB 320, the second conductive member 370 may be disposed inside the additional PCB disposed as being spaced apart from the second PCB 320 by the support structure 380, and thus may be disposed as being spaced apart from the first conductive member 360. For another example, when the first conductive member 360 is disposed on one surface of the additional PCB spaced apart from the second PCB 320, the second conductive member 370 may be disposed on the other surface, not one surface of the additional PCB on which the first conductive member 360 is disposed, whereby the second conductive member 370 may be disposed as being spaced apart from the first conductive member 360.

According to an embodiment of the disclosure, the second conductive member 370 may be formed of a patch antenna. The second conductive member 370 may be formed of the patch antenna for radiating the RF signal received from the second PCB 320. In addition, the second conductive member 370 may be formed of a metal material.

According to an embodiment of the disclosure, the support structure 380 may be disposed on the second surface of the second PCB 320. In addition, the additional PCB may be disposed at one end of the support structure 380 opposite to one end coupled to the second PCB 320. According to this, an air layer may be formed between the additional PCB and the second PCB 320, and the second PCB 320 may be spaced apart from the additional PCB by the support structure 380. As the first conductive member 360 and the second conductive member 370 are spaced apart by the air layer formed by the support structure 380, an antenna radiation efficiency may be increased. As described later in FIG. 7, the support structure 380 may be formed of a conductive material or a non-conductive material.

According to an embodiment of the disclosure, the additional PCB may be formed based on radiation performance and transmission efficiency, or the like. For example, the additional PCB may be formed of a high-end PCB. For another example, the additional PCB may be formed of a flexible PCB (FPCB).

As described above, the antenna device **300*b* may be formed to include seven antenna elements on one second PCB 320. The one second PCB 320 and seven antenna elements of the antenna device 300*b* may be configured as one antenna module, and the antenna module may be separated from the first PCB 310. Here, each of the antenna elements may be formed of one first conductive member 360, one second conductive member 370, and a part of the support structure 380. In addition, the RF signals processed by the RFICs 350-1 and 350-2 of the antenna device 300*b* may be forwarded to the second PCB 320 through different paths respectively by seven feeding lines included in the feeding structure 315 of the first PCB 310. Here, the feeding structure 315 of the first PCB 310 may be formed into a structure for minimizing a transmission loss. For example, the feeding structure 315 may be formed into a vertical structure passing through the holes of the plurality of layers of the first PCB 310. The respective RF signals may be forwarded to and radiated from the first conductive member 360 through the different feeding lines including the RF routing layer respectively in the second PCB 320. Here, the RF routing layer of the second PCB 320 may be formed into a horizontal structure with respect to the plurality of layers of the second PCB 320. According to this, the RF routing layer may be electrically connected to a conductive member (antenna element) that may be widely disposed on the second PCB 320 or additional PCB. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*b* including a detachable PCB of an embodiment of the disclosure is separated into the first PCB 310 and the second PCB 320, the first PCB 310 may perform vertical RF signal forwarding, and the second PCB 320** may perform relatively horizontal RF signal forwarding. According to this, the production cost may be reduced, and the transmission efficiency may be increased, and the antenna module may be easily replaced even if a design change or a failure of some devices occurs.

Figure 3C:
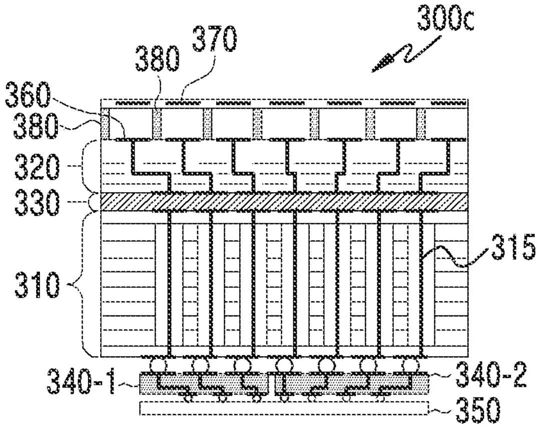

Referring to the antenna device **300*c* of FIG. 3C, the antenna device 300*c* may include a first printed circuit board (PCB) 310, a second PCB 320, a connection unit 330, two package boards (PKGs) 340-1 and 340-2, a radio frequency integrated circuit (RFIC) 350, a first conductive member 360, a second conductive member 370, and a support structure 380**.

According to an embodiment of the disclosure, the first PCB 310 may be disposed between the connection unit 330 and the PKGs 340-1 and 340-2. At this time, the first PCB 310 may be connected to the PKGs 340-1 and 340-2 on a first surface of the first PCB 310 by seven ball grid arrays (BGAs), and the connection unit 330 may be disposed on a second surface of the first PCB 310. Here, the first surface of the first PCB 310 may mean a surface opposite to the second surface. In the antenna device **300*c*, it is exemplary that the first PCB 310 is connected to the PKG 340-1 by three BGAs, and is connected to the PKG 340-2 by four BGAs, and the disclosure is not limited thereto. For example, the first PCB 310 may be coupled to the PKGs 340-1 and 340-2** by more or fewer than the seven BGAs, and may be coupled by other coupling schemes (e.g., a pin grid array (PGA) or a land grid array (LGA), or the like).

According to an embodiment of the disclosure, the first PCB 310 may be formed of a plurality of layers. For example, the first PCB 310 of the antenna device 300*c* may be formed of ten layers. In addition, the first PCB 310 may include a feeding structure 315. For example, the feeding structure 315 of the first PCB 310 may include seven feeding lines. In this case, the feeding lines may mean paths for forwarding a radio frequency (RF) signal processed by the RFIC 350. According to an embodiment of the disclosure, the feeding structure 315 may be formed to connect the second surface of the first PCB 310 from the first surface of the first PCB 310. In this case, the feeding lines of the feeding structure 315 may be formed into a structure for maximizing a transmission efficiency by minimizing a transmission loss. For example, the feeding structure 315 may be formed into a structure vertically connecting from the first surface of the first PCB 310 to the second surface. According to an embodiment of the disclosure, the feeding lines of the feeding structure 315 may be formed to pass through holes formed in the plurality of layers inside the first PCB 310. For example, the feeding lines of the feeding structure 315 may be formed of a coaxial plating through hole (PTH). In the antenna device 300*c*, the feeding structure 315 is illustrated to include seven feeding lines, but the disclosure is not limited thereto, and the structure of the feeding structure 315 may be determined based on the plurality of antenna elements connected to the antenna device 300*c*. For example, the feeding structure 315 may include fewer or more than the seven feeding lines.

According to an embodiment of the disclosure, the first PCB 310 may forward, to the second PCB 320, an RF signal processed by the RFIC 350. The RF signal processed by the RFIC 350 may be forwarded to the second PCB 320 through the feeding structure 315 included in the first PCB 310. For example, here, the feeding may include forwarding a signal as well as supplying a power source.

According to an embodiment of the disclosure, the second PCB 320 may be disposed between the connection unit 330 and the plurality of antenna elements. In this case, the second PCB 320 may be connected to the plurality of antenna elements on the second surface, and the connection unit 330 may be disposed on the first surface of the second PCB 320. Here, the first surface of the second PCB 320 may mean a surface opposite to the second surface. In the antenna device 300*c*, the coupling of the second PCB 320 with seven antenna elements is exemplary, and the disclosure is not limited thereto. For example, as described in FIG. 2, the second PCB 320 may be connected to 256 antenna elements formed into a 16×16 array structure. As described later, the antenna element may mean one first conductive member 360, a part of the support structure 380, and one second conductive member 370, or may mean one first conductive member 360.

According to an embodiment of the disclosure, the second PCB 320 may be formed of a plurality of layers. For example, the second PCB 320 of the antenna device 300*c* may be formed of three layers. According to an embodiment of the disclosure, the second PCB 320 may include an RF routing layer. For example, at least one of the plurality of layers of the second PCB 320 may refer to the RF routing layer. The RF routing layer may refer to a part of a feeding line for forwarding, to the antenna element, an RF signal forwarded from the first PCB 310. For example, the RF routing layer may be formed separately from the feeding structure 315 of the first PCB 310. According to one embodiment of the disclosure, the RF routing layer may be formed in a horizontal direction on the first surface and second surface of the second PCB 320. To forward a signal forwarded from the RFIC 350 having a smaller size than those of the first PCB 310 and second PCB 320 to the plurality of antenna elements widely disposed through the second surface of the second PCB 320, the RF routing layer may be formed in a horizontal direction with the second surface of the second PCB 320, and thus the second PCB 320 may receive the RF signal processed by the RFIC 350 from the first PCB 310 and forward to the plurality of antenna elements.

According to an embodiment of the disclosure, the connection unit 330 may be disposed between the first PCB 310 and the second PCB 320 in order to electrically connect the first PCB 310 and the second PCB 320. For example, the connection unit 330 may be disposed between the second surface of the first PCB 310 and the first surface of the second PCB 320.

According to an embodiment of the disclosure, the connection unit 330 may be formed of a coupler or a connector. For example, as described later in FIG. 8, the connection unit 330 may be formed into a coupler structure, such as a capacitor. For another example, the connection unit 330 may be formed into a connector structure that is based on at least one scheme among a ball grid array (BGA), a land grid array (LGA), a conductive paste, and a surface mount device (SMD).

According to an embodiment of the disclosure, the connection unit 330 may forward an RF signal from the first PCB 310 to the second PCB 320. The connection unit 330 may forward the RF signal, by electrically connecting the first PCB 310 and the second PCB 320 by a coupler or a connector.

According to an embodiment of the disclosure, the PKGs 340-1 and 340-2 may be disposed between the first PCB 310 and the RFIC 350. For example, the PKG 340-1 may be coupled on the first surface of the first PCB 310 through three BGAs, and the PKG 340-2 may be coupled on the first surface of the first PCB 310 through four BGAs. However, the disclosure is not limited thereto, and the number of BGAs may be determined based on the number of the plurality of antenna elements of the antenna device 300*c*.

According to an embodiment of the disclosure, the RFIC 350 may be coupled to the PKG 340 through soldering. For example, the RFIC 350 may be coupled to the PKG 340-1 through three soldering points, and may be coupled to the PKG 340-2 through four soldering points. However, the disclosure is not limited thereto, and the number of soldering points may be determined based on the number of the plurality of antenna elements of the antenna device 300*c*. According to an embodiment of the disclosure, the RFIC 350 may include a plurality of RF components for processing an RF signal. For example, the RFIC 350 may include a power amplifier, a mixer, an oscillator, a digital to analog converter (DAC), an analog to digital converter (ADC), and the like. According to an embodiment of the disclosure, the RFIC 350 may process the RF signal in order to transmit or receive a targeted signal in the antenna device 300*c*, and the RF signal processed by the RFIC 350 may be transmitted or received through the PKGs 340-1 and 340-2, the first PCB 310, the connection unit 330, the second PCB 320, and the antenna element.

According to an embodiment of the disclosure, the PKGs 340-1 and 340-2 may refer to a substrate for connecting the RFIC 350 to the first PCB 310. Accordingly, the antenna device 300*c* may include an RFIC chip in which the PKGs 340-1 and 340-2 and the RFIC 350 are formed into one chip. For example, the structure of the antenna device 300*c* of FIG. 3C merely illustrates an example for description convenience, and may refer to other devices having substantially the same structure.

According to an embodiment of the disclosure, the antenna device 300*c* may include the plurality of antenna elements. For example, each antenna element may include the first conductive member 360, the second conductive member 370, and the support structure 380. For another example, each antenna element may include only the first conductive member 360. In other words, the construction of the antenna element may vary according to the structure of the antenna element. For example, when the antenna element includes only one patch antenna, the antenna element may include only the first conductive member 360. For another example, when the antenna element includes a double patch antenna, the antenna element may include the first conductive member 360, the second conductive member 370, and the support structures 380 for spacing the two conductive members apart. However, for description convenience's sake, it is assumed that the antenna device 300*a* includes the plurality of antenna elements formed of the first conductive member 360, the second conductive member 370, and the support structure 380.

According to an embodiment of the disclosure, the first conductive member 360 may be disposed on the second PCB 320. For example, the first conductive member 360 may be coupled through the second surface of the second PCB 320. According to another embodiment of the disclosure, the first conductive member 360 may be disposed as being spaced apart from the second PCB 320. For example, as described later in FIG. 5, the first conductive member 360 may be disposed as being spaced apart from the second PCB 320 by the support structure 380. More particularly, the first conductive member 360 may be disposed on a lower surface of the additional PCB spaced apart from the second PCB 320 by the support structure 380.

According to an embodiment of the disclosure, the first conductive member 360 may be formed of a patch antenna. The first conductive member 360 may be formed of the patch antenna for radiating the RF signal received from the second PCB 320. In addition, the first conductive member 360 may be formed of a metal material.

According to an embodiment of the disclosure, the first conductive member 360 may be fed directly or indirectly from the second PCB 320. For example, when the first conductive member 360 is disposed on the second surface of the second PCB 320, the first conductive member 360 may be fed directly by the feeding line including the RF routing layer of the second PCB 320. For another example, when the first conductive member 360 is disposed on one surface of the additional PCB spaced apart from the second PCB 320, the first conductive member 360 may be fed indirectly, by a method, such as coupling, from the feeding line of the second PCB 320. Here, the feeding may mean forwarding an RF signal as well as supplying a power source as described above.

According to an embodiment of the disclosure, the second conductive member 370 may be disposed as being spaced apart from the first conductive member 360. For example, when the first conductive member 360 is disposed on the second surface of the second PCB 320, the second conductive member 370 may be disposed inside the additional PCB disposed as being spaced apart from the second PCB 320 by the support structure 380, and thus may be disposed as being spaced apart from the first conductive member 360. For another example, when the first conductive member 360 is disposed on one surface of the additional PCB spaced apart from the second PCB 320, the second conductive member 370 may be disposed on the other surface, not one surface of the additional PCB on which the first conductive member 360 is disposed, whereby the second conductive member 370 may be disposed as being spaced apart from the first conductive member 360.

According to an embodiment of the disclosure, the second conductive member 370 may be formed of a patch antenna. The second conductive member 370 may be formed of the patch antenna for radiating the RF signal received from the second PCB 320. In addition, the second conductive member 370 may be formed of a metal material.

According to an embodiment of the disclosure, the support structure 380 may be disposed on the second surface of the second PCB 320. In addition, the additional PCB may be disposed at one end of the support structure 380 opposite to one end coupled to the second PCB 320. Accordingly, an air layer may be formed between the additional PCB and the second PCB 320, and the second PCB 320 may be spaced apart from the additional PCB by the support structure 380. As the first conductive member 360 and the second conductive member 370 are spaced apart by the air layer formed by the support structure 380, the antenna radiation efficiency may be increased. As described later in FIG. 7, the support structure 380 may be formed of a conductive material or a non-conductive material.

According to an embodiment of the disclosure, the additional PCB may be formed based on radiation performance and transmission efficiency, or the like. For example, the additional PCB may be formed of a high-end PCB. For another example, the additional PCB may be formed of a flexible PCB (FPCB).

As described above, the antenna device 300*c* may be formed to include seven antenna elements on one second PCB 320. The one second PCB 320 and seven antenna elements of the antenna device 300*a* may be configured as one antenna module, and the antenna module may be separated from the first PCB 310. Here, each of the antenna elements may be formed of one first conductive member 360, one second conductive member 370, and a part of the support structure 380. In addition, the RF signals processed by the RFIC 350 of the antenna device 300*c* may be forwarded to the second PCB 320 through different paths respectively by seven feeding lines included in the feeding structure 315 of the first PCB 310. Here, the feeding structure 315 of the first PCB 310 may be formed into a structure for minimizing a transmission loss. For example, the feeding structure 315 may be formed into a vertical structure passing through the holes of the plurality of layers of the first PCB 310. The respective RF signals may be forwarded to and radiated from the first conductive member 360 through the different feeding lines including the RF routing layer respectively in the second PCB 320. Here, the RF routing layer of the second PCB 320 may be formed into a horizontal structure with respect to the plurality of layers of the second PCB 320. Accordingly, the RF routing layer may be electrically connected to a conductive member (antenna element) that may be widely disposed on the second PCB 320 or additional PCB. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*c* including the detachable PCB of an embodiment of the disclosure is separated into the first PCB 310 and the second PCB 320, the first PCB 310 may perform vertical RF signal forwarding, and the second PCB 320 may perform relatively horizontal RF signal forwarding. Accordingly, the production cost may be reduced, and the transmission efficiency may be increased, and the antenna module may be easily replaced even if a design change or a failure of some devices occurs.

Figure 3D:
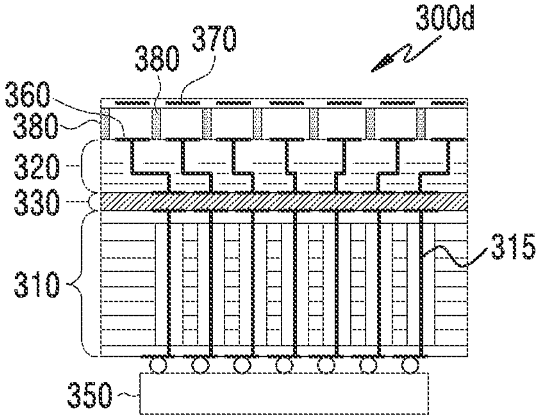

Referring to an antenna device 300*d* of FIG. 3D, the antenna device 300*a* may include a first printed circuit board (PCB) 310, a second PCB 320, a connection unit 330, a radio frequency integrated circuit (RFIC) 350, a first conductive member 360, a second conductive member 370, and a support structure 380. Compared to the antenna device 300*a*, the antenna device 300*d* may not include a package board (PKG) 340.

According to an embodiment of the disclosure, the first PCB 310 may be disposed between the connection unit 330 and the RFIC 350. At this time, the first PCB 310 may be connected to the RFIC 350 by seven ball grid arrays (BGAs) on the first surface of the first PCB 310, and the connection unit 330 may be disposed on the second surface of the first PCB 310. Here, the first surface of the first PCB 310 may mean a surface opposite to the second surface. In the antenna device 300*d*, the connection of the first PCB 310 with the RFIC 350 by seven BGAs is exemplary, and the disclosure is not limited thereto. For example, the first PCB 310 may be coupled to the RFIC 350 by more or fewer than the seven BGAs, and may be coupled by other coupling schemes (e.g., a pin grid array (PGA) or a land grid array (LGA), or the like).

According to an embodiment of the disclosure, the first PCB 310 may be formed of a plurality of layers. For example, the first PCB 310 of the antenna device 300*d* may be formed of ten layers. In addition, the first PCB 310 may include a feeding structure 315. For example, the feeding structure 315 of the first PCB 310 may include seven feeding lines. In this case, the feeding lines may mean paths for forwarding a radio frequency (RF) signal processed by the RFIC 350. According to an embodiment of the disclosure, the feeding structure 315 may be formed to connect the second surface of the first PCB 310 from the first surface of the first PCB 310. In this case, the feeding lines of the feeding structure 315 may be formed into a structure for maximizing a transmission efficiency by minimizing a transmission loss. For example, the feeding structure 315 may be formed into a structure vertically connecting from the first surface of the first PCB 310 to the second surface. According to an embodiment of the disclosure, the feeding lines of the feeding structure 315 may be formed to pass through holes formed in the plurality of layers inside the first PCB 310. For example, the feeding lines of the feeding structure 315 may be formed of a coaxial plating through hole (PTH). In the antenna device 300*d*, the feeding structure 315 is illustrated to include seven feeding lines, but the disclosure is not limited thereto, and the structure of the feeding structure 315 may be determined based on the plurality of antenna elements connected to the antenna device 300*d*. For example, the feeding structure 315 may include fewer or more than the seven feeding lines.

According to an embodiment of the disclosure, the first PCB 310 may forward, to the second PCB 320, an RF signal processed by the RFIC 350. The RF signal processed by the RFIC 350 may be forwarded to the second PCB 320 through the feeding structure 315 included in the first PCB 310. For example, here, the feeding may include forwarding a signal as well as supplying a power source.

According to an embodiment of the disclosure, the second PCB 320 may be disposed between the connection unit 330 and the plurality of antenna elements. In this case, the second PCB 320 may be connected to the plurality of antenna elements on the second surface, and the connection unit 330 may be disposed on the first surface of the second PCB 320. Here, the first surface of the second PCB 320 may mean a surface opposite to the second surface. In the antenna device 300*d*, it is exemplary that the second PCB 320 is coupled to seven antenna elements, and the disclosure is not limited thereto. For example, the second PCB 320 may be connected to 256 antenna elements formed into a 16×16 array structure as described in FIG. 2. The antenna element may mean one first conductive member 360, a part of the support structure 380, and one second conductive member 370, or mean one first conductive member 360, as described later.

According to an embodiment of the disclosure, the second PCB 320 may be formed of a plurality of layers. For example, the second PCB 320 of the antenna device 300*d* may be formed of three layers. According to an embodiment of the disclosure, the second PCB 320 may include an RF routing layer. For example, at least one of the plurality of layers of the second PCB 320 may refer to the RF routing layer. The RF routing layer may refer to a part of a feeding line for forwarding, to the antenna element, an RF signal forwarded from the first PCB 310. For example, the RF routing layer may be formed separately from the feeding structure 315 of the first PCB 310. According to one embodiment of the disclosure, the RF routing layer may be formed in a horizontal direction on the first surface and second surface of the second PCB 320. To forward a signal forwarded from the RFIC 350 having a smaller size than those of the first PCB 310 and second PCB 320 to the plurality of antenna elements widely disposed through the second surface of the second PCB 320, the RF routing layer may be formed in a horizontal direction with the second surface of the second PCB 320, and thus the second PCB 320 may receive the RF signal processed by the RFIC 350 from the first PCB 310 and forward to the plurality of antenna elements.

According to an embodiment of the disclosure, the connection unit 330 may be disposed between the first PCB 310 and the second PCB 320 in order to electrically connect the first PCB 310 and the second PCB 320. For example, the connection unit 330 may be disposed between the second surface of the first PCB 310 and the first surface of the second PCB 320.

According to an embodiment of the disclosure, the connection unit 330 may be formed of a coupler or a connector. For example, as described later in FIG. 8, the connection unit 330 may be formed into a coupler structure, such as a capacitor. For another example, the connection unit 330 may be formed into a connector structure that is based on at least one scheme among a ball grid array (BGA), a land grid array (LGA), a conductive paste, and a surface mount device (SMD).

According to an embodiment of the disclosure, the connection unit 330 may forward an RF signal from the first PCB 310 to the second PCB 320. The connection unit 330 may forward the RF signal, by electrically connecting the first PCB 310 and the second PCB 320 by a coupler or a connector.

According to an embodiment of the disclosure, the RFIC 350 may be directly coupled to the first PCB 310 through a BGA. For example, the RFIC 350 may be coupled to the first PCB 310 through seven BGAs. However, the disclosure is not limited thereto, and the number of BGAs may be determined based on the number of the plurality of antenna elements of the antenna device 300*d*. According to an embodiment of the disclosure, the RFIC 350 may include a plurality of RF components for processing an RF signal. For example, the RFIC 350 may include a power amplifier, a mixer, an oscillator, a digital to analog converter (DAC), an analog to digital converter (ADC), and the like. According to an embodiment of the disclosure, the RFIC 350 may process the RF signal in order to transmit or receive a targeted signal in the antenna device 300*a*, and the RF signal processed by the RFIC 350 may be transmitted or received through the first PCB 310, the connection unit 330, the second PCB 320, and the antenna element.

According to an embodiment of the disclosure, the antenna device 300*d* may include the plurality of antenna elements. For example, each antenna element may include the first conductive member 360, the second conductive member 370, and the support structure 380. For another example, each antenna element may include only the first conductive member 360. In other words, the construction of the antenna element may vary according to the structure of the antenna element. For example, when the antenna element includes only one patch antenna, the antenna element may include only the first conductive member 360. For another example, when the antenna element includes a double patch antenna, the antenna element may include the first conductive member 360, the second conductive member 370, and the support structures 380 for spacing the two conductive members apart. However, for description convenience's sake, it is assumed that the antenna device 300*d* includes the plurality of antenna elements formed of the first conductive member 360, the second conductive member 370, and the support structure 380.

According to an embodiment of the disclosure, the first conductive member 360 may be disposed on the second PCB 320. For example, the first conductive member 360 may be coupled through the second surface of the second PCB 320. According to another embodiment of the disclosure, the first conductive member 360 may be disposed as being spaced apart from the second PCB 320. For example, as described later in FIG. 5, the first conductive member 360 may be disposed as being spaced apart from the second PCB 320 by the support structure 380. More particularly, the first conductive member 360 may be disposed on a lower surface of the additional PCB spaced apart from the second PCB 320 by the support structure 380.

According to an embodiment of the disclosure, the first conductive member 360 may be formed of a patch antenna. The first conductive member 360 may be formed of the patch antenna for radiating the RF signal received from the second PCB 320. In addition, the first conductive member 360 may be formed of a metal material.

According to an embodiment of the disclosure, the first conductive member 360 may be fed directly or indirectly from the second PCB 320. For example, when the first conductive member 360 is disposed on the second surface of the second PCB 320, the first conductive member 360 may be fed directly by a feeding line including the RF routing layer of the second PCB 320. For another example, when the first conductive member 360 is disposed on one surface of the additional PCB spaced apart from the second PCB 320, the first conductive member 360 may be fed indirectly, by a method, such as coupling, from the feeding line of the second PCB 320. Here, the feeding may mean forwarding an RF signal as well as supplying a power source as described above.

According to an embodiment of the disclosure, the second conductive member 370 may be disposed as being spaced apart from the first conductive member 360. For example, when the first conductive member 360 is disposed on the second surface of the second PCB 320, the second conductive member 370 may be disposed inside the additional PCB disposed as being spaced apart from the second PCB 320 by the support structure 380, and thus may be disposed as being spaced apart from the first conductive member 360. For another example, when the first conductive member 360 is disposed on one surface of the additional PCB spaced apart from the second PCB 320, the second conductive member 370 may be disposed on the other surface, not one surface of the additional PCB on which the first conductive member 360 is disposed, whereby the second conductive member 370 may be disposed as being spaced apart from the first conductive member 360.

According to an embodiment of the disclosure, the second conductive member 370 may be formed of a patch antenna. The second conductive member 370 may be formed of the patch antenna for radiating the RF signal received from the second PCB 320. In addition, the second conductive member 370 may be formed of a metal material.

According to an embodiment of the disclosure, the support structure 380 may be disposed on the second surface of the second PCB 320. In addition, the additional PCB may be disposed at one end of the support structure 380 opposite to one end coupled to the second PCB 320. Accordingly, an air layer may be formed between the additional PCB and the second PCB 320, and the second PCB 320 may be spaced apart from the additional PCB by the support structure 380. As the first conductive member 360 and the second conductive member 370 are spaced apart by the air layer formed by the support structure 380, the antenna radiation efficiency may be increased. As described later in FIG. 7, the support structure 380 may be formed of a conductive material or a non-conductive material.

According to an embodiment of the disclosure, the additional PCB may be formed based on radiation performance and transmission efficiency. For example, the additional PCB may be formed of a high-end PCB. For another example, the additional PCB may be formed of a flexible PCB (FPCB).

As described above, the antenna device 300*d* may be formed to include seven antenna elements on one second PCB 320. The one second PCB 320 and seven antenna elements of the antenna device 300*d* may be configured as one antenna module, and the antenna module may be separated from the first PCB 310. Here, each of the antenna elements may be formed of one first conductive member 360, one second conductive member 370, and a part of the support structure 380. In addition, the RF signals processed by the RFIC 350 of the antenna device 300*d* may be forwarded to the second PCB 320 through different paths respectively by seven feeding lines included in the feeding structure 315 of the first PCB 310. Here, the feeding structure 315 of the first PCB 310 may be formed into a structure for minimizing a transmission loss. For example, the feeding structure 315 may be formed into a vertical structure passing through the holes of the plurality of layers of the first PCB 310. The respective RF signals may be forwarded to and radiated from the first conductive member 360 through the different feeding lines including the RF routing layer respectively in the second PCB 320. Here, the RF routing layer of the second PCB 320 may be formed into a horizontal structure with respect to the plurality of layers of the second PCB 320. Accordingly, the RF routing layer may be electrically connected to a conductive member (antenna element) that may be widely disposed on the second PCB 320 or additional PCB. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*d* including the detachable PCB of an embodiment of the disclosure is separated into the first PCB 310 and the second PCB 320, the first PCB 310 may perform vertical RF signal forwarding, and the second PCB 320 may perform relatively horizontal RF signal forwarding. Accordingly, the production cost may be reduced, and the transmission efficiency may be increased, and the antenna module may be easily replaced even if a design change or a failure of some devices occurs.

Figure 3E:
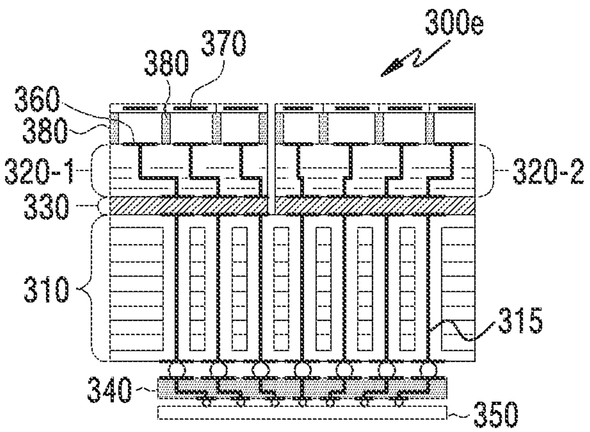

Referring to the antenna device 300*e* of FIG. 3E, the antenna device 300*e* may include a first printed circuit board (PCB) 310, two second PCBs 320-1 and 320-2, a connection unit 330, a package board (PKG) 340, a radio frequency integrated circuit (RFIC) 350, a first conductive member 360, a second conductive member 370, and a support structure 380.

According to an embodiment of the disclosure, the first PCB 310 may be disposed between the connection unit 330 and the PKG 340. At this time, the first PCB 310 may be connected to the PKG 340 on a first surface of the first PCB 310 by seven ball grid arrays (BGAs), and the connection unit 330 may be disposed on a second surface of the first PCB 310. Here, the first surface of the first PCB 310 may mean a surface opposite to the second surface. In the antenna device 300*e*, the connecting of the first PCB 310 with the PKG 340 by seven BGAs is exemplary, and the disclosure is not limited thereto. For example, the first PCB 310 may be coupled to the PKG 340 by more or fewer than the seven BGAs, and may be coupled by other coupling schemes (e.g., a pin grid array (PGA) or a land grid array (LGA), or the like).

According to an embodiment of the disclosure, the first PCB 310 may be formed of a plurality of layers. For example, the first PCB 310 of the antenna device 300*e* may be formed of ten layers. In addition, the first PCB 310 may include a feeding structure 315. For example, the feeding structure 315 of the first PCB 310 may include seven feeding lines. In this case, the feeding lines may mean paths for forwarding a radio frequency (RF) signal processed by the RFIC 350. According to an embodiment of the disclosure, the feeding structure 315 may be formed to connect the second surface of the first PCB 310 from the first surface of the first PCB 310. In this case, the feeding lines of the feeding structure 315 may be formed into a structure for maximizing a transmission efficiency by minimizing a transmission loss. For example, the feeding structure 315 may be formed into a structure vertically connecting from the first surface of the first PCB 310 to the second surface. According to an embodiment of the disclosure, the feeding lines of the feeding structure 315 may be formed to pass through holes formed in the plurality of layers inside the first PCB 310. For example, the feeding lines of the feeding structure 315 may be formed of a coaxial plating through hole (PTH). In the antenna device 300*e*, the feeding structure 315 is illustrated to include the seven feeding lines, but the disclosure is not limited thereto, and the structure of the feeding structure 315 may be determined based on the plurality of antenna elements connected to the antenna device 300*e*. For example, the feeding structure 315 may include fewer or more than the seven feeding lines.

According to an embodiment of the disclosure, the first PCB 310 may forward, to the second PCBs 320-1 and 320-2, an RF signal processed by the RFIC 350. The RF signal processed by the RFIC 350 may be forwarded to the second PCBs 320-1 and 320-2 through the feeding structure 315 included in the first PCB 310. For example, here, the feeding may include forwarding a signal as well as supplying a power source.

According to an embodiment of the disclosure, the second PCBs 320-1 and 320-2 may be disposed between the connection unit 330 and the plurality of antenna elements. At this time, the second PCBs 320-1 and 320-2 may be connected to the plurality of antenna elements on the second surface, and the connection unit 330 may be disposed on the first surface of the second PCBs 320-1 and 320-2. For example, the second PCB 320-1 may be coupled with three antenna elements, and the second PCB 320-2 may be coupled with four antenna elements. Here, the first surface of the second PCBs 320-1 and 320-2 may mean a surface opposite to the second surface. In the antenna device 300*e*, the coupling of the second PCBs 320-1 and 320-2 with seven antenna elements is exemplary, and the disclosure is not limited thereto. For example, the second PCBs 320-1 and 320-2 may be connected to 256 antenna elements formed into a 16×16 array structure as described in FIG. 2. The antenna element may mean one first conductive member 360, a part of the support structure 380, and one second conductive member 370, or mean one first conductive member 360, as described later.

According to an embodiment of the disclosure, the second PCBs 320-1 and 320-2 may be formed of a plurality of layers. For example, the second PCBs 320-1 and 320-2 of the antenna device 300*e* may be formed of three layers. According to an embodiment of the disclosure, the second PCBs 320-1 and 320-2 may include an RF routing layer. For example, at least one of the plurality of layers of the second PCBs 320-1 and 320-2 may refer to an RF routing layer. The RF routing layer may refer to a part of a feeding line for forwarding, to the antenna element, an RF signal forwarded from the first PCB 310. For example, the RF routing layer may be formed separately from the feeding structure 315 of the first PCB 310. According to an embodiment of the disclosure, the RF routing layer may be formed in a horizontal direction on the first surface and second surface of the second PCBs 320-1 and 320-2. To forward a signal forwarded from the RFIC 350 having a smaller size than those of the first PCB 310 and second PCBs 320-1 and 320-2 to the plurality of antenna elements disposed widely through the second surface of the second PCBs 320-1 and 320-2, the RF routing layer may be formed in a horizontal direction with the second surface of the second PCBs 320-1 and 320-2, and accordingly to this, the second PCBs 320-1 and 320-2 may receive the RF signal processed by the RFIC 350 from the first PCB 310 and forward to the plurality of antenna elements.

According to an embodiment of the disclosure, the connection unit 330 may be disposed between the first PCB 310 and the second PCBs 320-1 and 320-2 in order to electrically connect the first PCB 310 and the second PCBs 320-1 and 320-2. For example, the connection unit 330 may be disposed between the second surface of the first PCB 310 and the first surface of the second PCBs 320-1 and 320-2. In this case, the connection unit 330 may be disposed between the first PCB 310 and the second PCBs 320-1 and 320-2, but the connection unit 330 may not be disposed in a region spaced apart between the second PCB 320-1 and the second PCB 320-2.

According to an embodiment of the disclosure, the connection unit 330 may be formed of a coupler or a connector. For example, as described later in FIG. 8, the connection unit 330 may be formed into a coupler structure, such as a capacitor. For another example, the connection unit 330 may be formed into a connector structure that is based on at least one scheme among a ball grid array (BGA), a land grid array (LGA), a conductive paste, and a surface mount device (SMD).

According to an embodiment of the disclosure, the connection unit 330 may forward an RF signal from the first PCB 310 to the second PCBs 320-1 and 320-2. The connection unit 330 may forward the RF signal, by electrically connecting the first PCB 310 and the second PCBs 320-1 and 320-2 by a coupler or a connector.

According to an embodiment of the disclosure, the PKG 340 may be disposed between the first PCB 310 and the RFIC 350. For example, the PKG 340 may be coupled through seven BGAs on the first surface of the first PCB 310. However, the disclosure is not limited thereto, and the number of BGAs may be determined based on the number of the plurality of antenna elements of the antenna device 300*e*.

According to an embodiment of the disclosure, the RFIC 350 may be coupled to the PKG 340 through soldering. For example, the RFIC 350 may be coupled to the PKG 340 through seven soldering points. However, the disclosure is not limited thereto, and the number of soldering points may be determined based on the number of the plurality of antenna elements of the antenna device 300*e*. According to an embodiment of the disclosure, the RFIC 350 may include a plurality of RF components for processing an RF signal. For example, the RFIC 350 may include a power amplifier, a mixer, an oscillator, a digital to analog converter (DAC), an analog to digital converter (ADC), and the like. According to an embodiment of the disclosure, the RFIC 350 may process the RF signal in order to transmit or receive a targeted signal in the antenna device 300*e*, and the RF signal processed by the RFIC 350 may be transmitted or received through the PKG 340, the first PCB 310, the connection unit 330, the second PCBs 320-1 and 320-2, and the antenna element.

According to an embodiment of the disclosure, the PKG 340 may refer to a substrate for connecting the RFIC 350 to the first PCB 310. Accordingly, the antenna device 300*e* may include an RFIC chip in which the PKG 340 and the RFIC 350 are formed into one chip. For example, the structure of the antenna device 300*e* of FIG. 3E merely illustrates an example for description convenience, and may refer to other devices having substantially the same structure.

According to an embodiment of the disclosure, the antenna device 300*e* may include the plurality of antenna elements. For example, each antenna element may include the first conductive member 360, the second conductive member 370, and the support structure 380. For another example, each antenna element may include only the first conductive member 360. In other words, the construction of the antenna element may vary according to the structure of the antenna element. For example, when the antenna element includes only one patch antenna, the antenna element may include only the first conductive member 360. For another example, when the antenna element includes a double patch antenna, the antenna element may include the first conductive member 360, the second conductive member 370, and the support structures 380 for spacing the two conductive members apart. However, for description convenience's sake, it is assumed that the antenna device 300*e* includes the plurality of antenna elements formed of the first conductive member 360, the second conductive member 370, and the support structure 380.

According to an embodiment of the disclosure, the first conductive member 360 may be disposed on the second PCBs 320-1 and 320-2. For example, the first conductive member 360 may be coupled through the second surface of the second PCBs 320-1 and 320-2. According to another embodiment of the disclosure, the first conductive member 360 may be disposed as being spaced apart from the second PCBs 320-1 and 320-2. For example, as described later in FIG. 5, the first conductive member 360 may be disposed as being spaced apart from the second PCBs 320-1 and 320-2 by the support structure 380. More particularly, the first conductive member 360 may be disposed on a lower surface of the additional PCB spaced apart from the second PCBs 320-1 and 320-2 by the support structure 380.

According to an embodiment of the disclosure, the first conductive member 360 may be formed of a patch antenna. The first conductive member 360 may be formed of the patch antenna for radiating an RF signal received from the second PCBs 320-1 and 320-2. In addition, the first conductive member 360 may be formed of a metal material.

According to an embodiment of the disclosure, the first conductive member 360 may be fed directly or indirectly from the second PCBs 320-1 and 320-2. For example, when the first conductive member 360 is disposed on the second surface of the second PCBs 320-1 and 320-2, the first conductive member 360 may be fed directly by a feeding line including the RF routing layer of the second PCBs 320-1 and 320-2. For another example, when the first conductive member 360 is disposed on one surface of the additional PCB spaced apart from the second PCBs 320-1 and 320-2, the first conductive member 360 may be fed indirectly from the feeding line of the second PCBs 320-1 and 320-2 in a method, such as coupling. Here, the feeding may mean forwarding an RF signal as well as supplying a power source as described above.

According to an embodiment of the disclosure, the second conductive member 370 may be disposed as being spaced apart from the first conductive member 360. For example, when the first conductive member 360 is disposed on the second surface of the second PCBs 320-1 and 320-2, the second conductive member 370 may be disposed inside the additional PCB disposed as being spaced apart from the second PCBs 320-1 and 320-2 by the support structure 380, and thus may be disposed as being spaced apart from the first conductive member 360. For another example, when the first conductive member 360 is disposed on one surface of the additional PCB spaced apart from the second PCBs 320-1 and 320-2, the second conductive member 370 may be disposed on the other surface, not one surface of the additional PCB on which the first conductive member 360 is disposed, whereby the second conductive member 370 may be disposed as being spaced apart from the first conductive member 360.

According to an embodiment of the disclosure, the second conductive member 370 may be formed of a patch antenna. The second conductive member 370 may be formed of the patch antenna for radiating an RF signal received from the second PCBs 320-1 and 320-2. In addition, the second conductive member 370 may be formed of a metal material.

According to an embodiment of the disclosure, the support structure 380 may be disposed on the second surface of the second PCBs 320-1 and 320-2. In addition, the additional PCB may be disposed at one end opposite to one end coupled to the second PCBs 320-1 and 320-2 of the support structure 380. According to this, an air layer may be formed between the additional PCB and the second PCBs 320-1 and 320-2, and the second PCB 320 may be spaced apart from the additional PCB by the support structure 380. As the first conductive member 360 and the second conductive member 370 are spaced apart by the air layer formed by the support structure 380, the antenna radiation efficiency may be increased. As described later in FIG. 7, the support structure 380 may be formed of a conductive material or a non-conductive material.

According to an embodiment of the disclosure, the additional PCB may be formed based on radiation performance and transmission efficiency. For example, the additional PCB may be formed of a high-end PCB. For another example, the additional PCB may be formed of a flexible PCB (FPCB).

As described above, the antenna device 300*e* may be formed to include three antenna elements on the second PCB 320-1, and may be formed to include four antenna elements on the second PCB 320-2. The one second PCB 320-1 and three antenna elements of the antenna device 300*e* may be configured as one antenna module, and the one second PCB 320-2 and four antenna elements may be configured as another antenna module. According to this, the antenna modules may be separated from the first PCB 310. Here, each of the antenna elements may be formed of one first conductive member 360, one second conductive member 370, and a part of the support structure 380. In addition, the RF signal processed by the RFIC 350 of the antenna device 300*e* may be forwarded to the second PCBs 320-1 and 320-2 through different paths respectively by seven feeding lines included in the feeding structure 315 of the first PCB 310. Here, the feeding structure 315 of the first PCB 310 may be formed into a structure for minimizing a transmission loss. For example, the feeding structure 315 may be formed into a vertical structure passing through the holes of the plurality of layers of the first PCB 310. The respective RF signals may be forwarded to and radiated from the first conductive member 360 through the different feeding lines including the RF routing layer respectively in the second PCBs 320-1 and 320-2. Here, the RF routing layer of the second PCBs 320-1 and 320-2 may be formed into a horizontal structure with respect to the plurality of layers of the second PCBs 320-1 and 320-2. According to this, the RF routing layer may be electrically connected to a conductive member (antenna element) that may be widely disposed on the second PCBs 320-1 and 320-2 or the additional PCB. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*e* including a detachable PCB of an embodiment of the disclosure is separated into the first PCB 310 and the second PCBs 320-1 and 320-2, the first PCB 310 may perform vertical RF signal forwarding, and the second PCBs 320-1 and 320-2 may perform relatively horizontal RF signal forwarding. Accordingly, the production cost may be reduced, and the transmission efficiency may be increased, and the antenna module may be easily replaced even if a design change or a failure of some devices occurs.

Figure 3F:
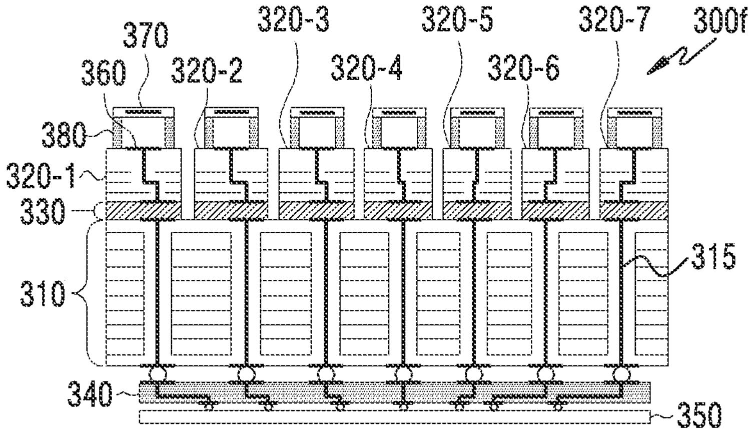

An antenna device 300*f* of FIG. 3F may mean another example of the antenna device 300*e*. For example, unlike the second PCBs 320-1 and 320-2 of the antenna device 300*e* coupled with the three and four antenna elements respectively, second PCBs 320-1 to 320-7 of the antenna device 300*f* may be coupled with one antenna element, respectively. Accordingly, the antenna element (e.g., antenna device 300*f*) may include seven antenna modules, and the second PCBs 320-1 to 300-7 of the respective antenna modules may be separated from the first PCB 310. According to an embodiment of the disclosure, the second PCBs 320-1 to 320-7 may be formed of a plurality of layers, and at least one layer may include an RF routing layer. For example, each of the second PCBs 320-1 to 320-7 may include the RF routing layer for forwarding an RF signal to each antenna element. The RF routing layer may be separated from the feeding structure 315 of the first PCB 310. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*f* including a detachable PCB of an embodiment of the disclosure is separated into the first PCB 310 and the second PCBs 320-1 to 320-7, the first PCB 310 may perform vertical RF signal forwarding by the feeding structure 315, and the second PCBs 320-1 to 320-7 may perform relatively horizontal RF signal forwarding by the RF routing layer. According to this, the production cost may be reduced, and the transmission efficiency may be increased, and the antenna module may be easily replaced even if a design change or a failure of some devices occurs.

Figure 3G:
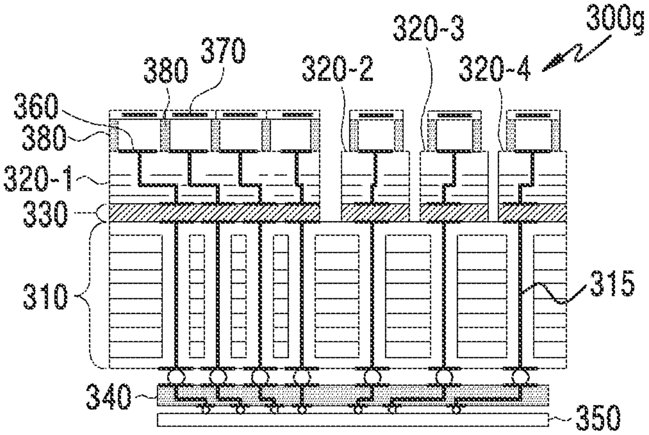

The antenna device 300*g* of FIG. 3G may mean a further example of the antenna device 300*e*. For example, unlike the second PCBs 320-1 and 320-2 of the antenna device 300*e* coupled with the three and four antenna elements respectively, the second PCB 320-1 of the antenna device 300*g* may be coupled with four antenna elements, and each of the second PCBs 320-2 to 320-4 may be coupled with one antenna element. Accordingly, the antenna element (e.g., antenna device 300*g*) may include four antenna modules, and the second PCBs 320-1 to 320-4 of the respective antenna modules may be separated from the first PCB 310. According to an embodiment of the disclosure, the second PCBs 320-1 to 320-4 may be formed of a plurality of layers, and at least one layer may include an RF routing layer. For example, each of the second PCBs 320-1 to 320-4 may include the RF routing layer for forwarding an RF signal to each antenna element. The RF routing layer may be separated from the feeding structure 315 of the first PCB 310. In the related art, one PCB includes a plurality of laminated structures, and thus a production cost is high, and a transmission efficiency is low, and replacement resulting from a design change and a failure of some devices (e.g., antenna elements) is difficult. Unlike this, since a PCB structure of the antenna device 300*g* including a detachable PCB of an embodiment of the preset disclosure is separated into the first PCB 310 and the second PCBs 320-1 to 320-4, the first PCB 310 may perform vertical RF signal forwarding by the feeding structure 315, and the second PCBs 320-1 to 320-4 may perform relatively horizontal RF signal forwarding by the RF routing layer. According to this, the production cost may be reduced, and the transmission efficiency may be increased, and the antenna module may be easily replaced even if a design change or a failure of some devices occurs.

As described above, in FIGS. 3A, 3B, 3C, 3D, 3E, 3F, and 3G, a structure of an antenna device including a detachable PCB of various embodiments of the disclosure has been described. The antenna device includes the detachable PCB, thereby being separated into a portion including an RFIC for processing a signal and a first PCB (e.g., a main PCB, a motherboard, or the like), and a portion including an antenna (e.g., an antenna element, a sub-array, an antenna array, or the like) and a second PCB (e.g., an antenna PCB, an RF PCB, an RF board, or the like). According to this, unlike a structure in which a large number of lamination is made through one PCB, the disclosure may laminate a relatively small number on each PCB, and thus the production cost may be reduced. In addition, as the number of laminated PCBs increases, an RF signal passing therethrough may have a greater transmission loss, but the disclosure may minimize the transmission loss through two PCBs having a low number of lamination. When a design change and a failure of some elements occur, the disclosure may change or replace a modularized antenna portion, thereby increasing efficiency.

Figure 4:
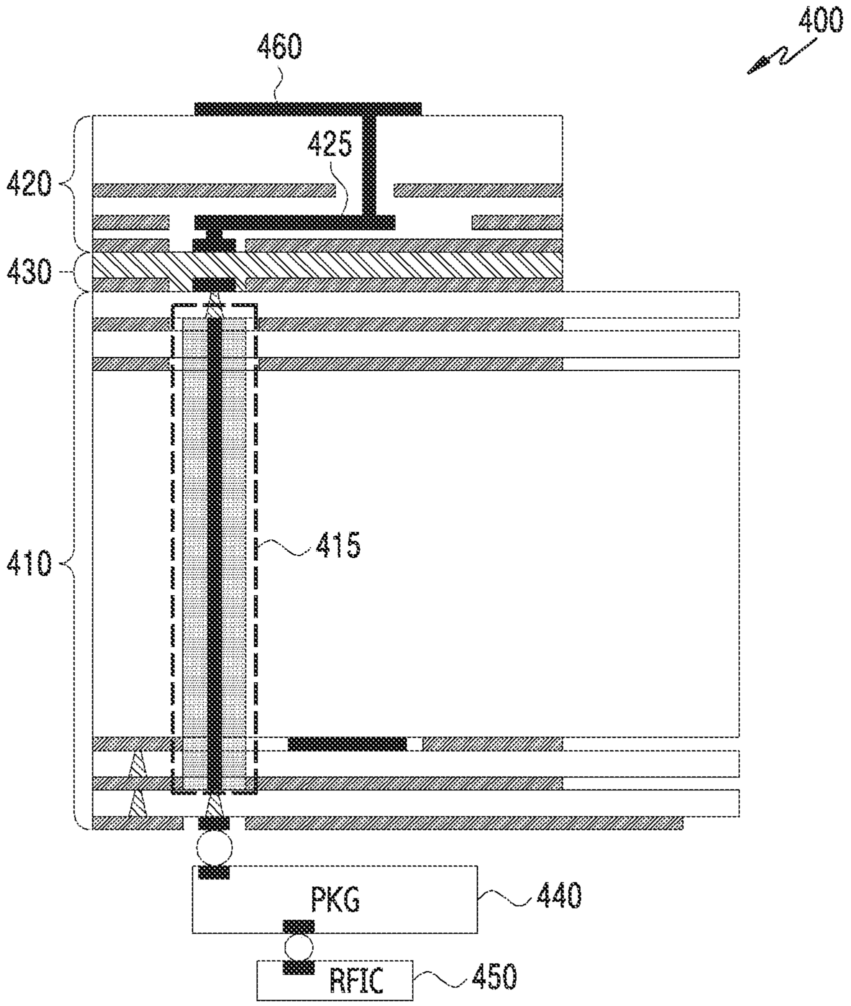
FIG. 4 illustrates a structure of an antenna device according to an embodiment of the disclosure.

FIG. 4 illustrates a structure of an antenna device according to an embodiment of the disclosure.

Referring to FIG. 4, for description convenience's sake, an antenna device including one antenna element will be described as an example. However, the disclosure is not limited thereto. For example, as described in FIG. 2, a first PCB may include a plurality of antenna arrays (e.g., four antenna arrays formed as a 2×2 array structure), and each antenna array may include 256 antenna elements in a 16×16 array structure.

Referring to FIG. 4, the antenna device 400 may include a first PCB 410, a second PCB 420, a connection unit 430, a package board (PKG) 440, and an RFIC 450. Here, the structure of the antenna device 400 is for an example, and the disclosure is not limited thereto. For example, the PKG 440 and the RFIC 450 may be formed of one RFIC chip. For another example, the RFIC 450 may be directly connected to the first PCB 410 through a BGA. For further example, the number of lamination of the first PCB 410 and the second PCB 420 may be different.

According to an embodiment of the disclosure, the first PCB 410 may include a plurality of layers, and may include a feeding structure 415 passing through holes formed in the plurality of layers of the first PCB 410. The feeding structure 415 may be connected to the RFIC 450 through the PKG 440 on a first surface of the first PCB 410. In addition, the feeding structure 415 may be disposed between a second surface of the first PCB 410 and a first surface of the second PCB 420, and forward an RF signal processed by the RFIC 450, to the second PCB 420, through the connection unit 430 electrically connecting the first PCB 410 and the second PCB 420. In this case, the feeding structure 415 may be formed to vertically connect between the first surface, and the second surface, of the first PCB 410 based on a transmission efficiency.

According to an embodiment of the disclosure, the second PCB 420 may include a first conductive member 460 as one antenna element. For example, the first conductive member 460 may be a patch antenna. According to an embodiment of the disclosure, the second PCB 420 may include a plurality of layers, and at least one of the plurality of layers of the second PCB 420 may include an RF routing layer 425. The RF routing layer 425 may be formed horizontally with a first surface, and a second surface, of the second PCB 420 in order to feed the first conductive member 460 disposed on the second PCB 420. According to this, the feeding structure 415 of the first PCB 410 may be formed to have a vertical structure instead of a horizontal one, and minimize a transmission loss. In addition, the RF routing layer 425 is formed horizontally, whereby an RF signal may be forwarded to a plurality of antenna elements formed widely on the second PCB 420 from the RFIC 450 having a relatively smaller size than those of the first PCB 410 and the second PCB 420. As described above, the first PCB 410 and the second PCB 420 may be separated by the connection unit 430, and one antenna module which includes the second PCB 420 disposed on an upper end of the connection unit 430 and the antenna element (e.g., the first conductive member 460) may be formed.

Figure 5:
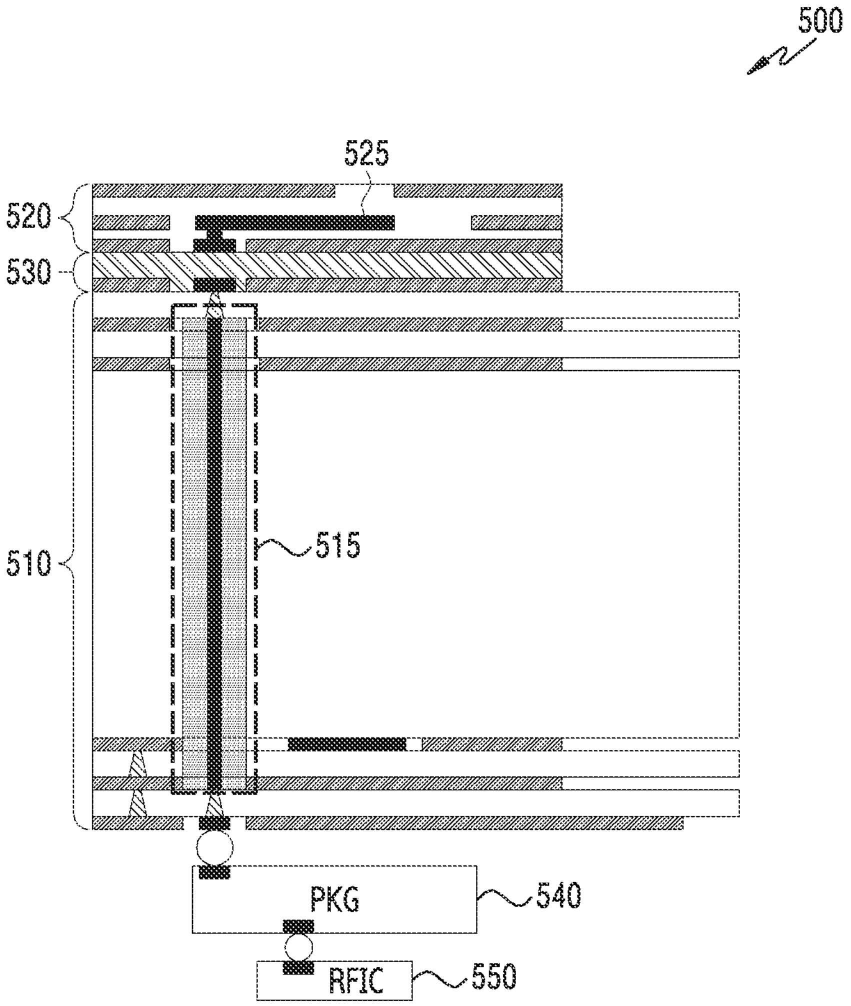
FIG. 5 illustrates a structure of an antenna device according to an embodiment of the disclosure.

FIG. 5 illustrates a structure of an antenna device according to an embodiment of the disclosure.

Referring to FIG. 5, an antenna device 500 may be formed to have a structure similar to that of the antenna device 400 of FIG. 4 and may include a first PCB 510, a second PCB 520, a connection unit 530, a package board (PKG) 540, and an RFIC 550. For example, a first PCB 510 of the antenna device 500 of FIG. 5 may be formed to have the same structure as the first PCB 410 of the antenna device 400 of FIG. 4. Accordingly, a description of the same structure will be omitted. However, according to an embodiment of the disclosure, unlike the antenna device 400 of FIG. 4, in the antenna device 500 of FIG. 5, the second PCB 420 may not include the first conductive member 460 for radiating an RF signal. The second PCB 520 of the antenna device 500 may include a plurality of layers, wherein at least one of the plurality of layers of the second PCB 520 may be formed of an RF routing layer 525. As described later in FIG. 6B, the antenna device 500 may include radiators for an RF signal in an additional PCB other than the second PCB 520. In this case, the RF routing layer 525 may indirectly feed (e.g., coupling feed) the radiators disposed on the additional PCB. Considering the above, the second PCB 520 of the antenna device 500 and the radiators of the additional PCB may form one antenna module.

Figure 6A:
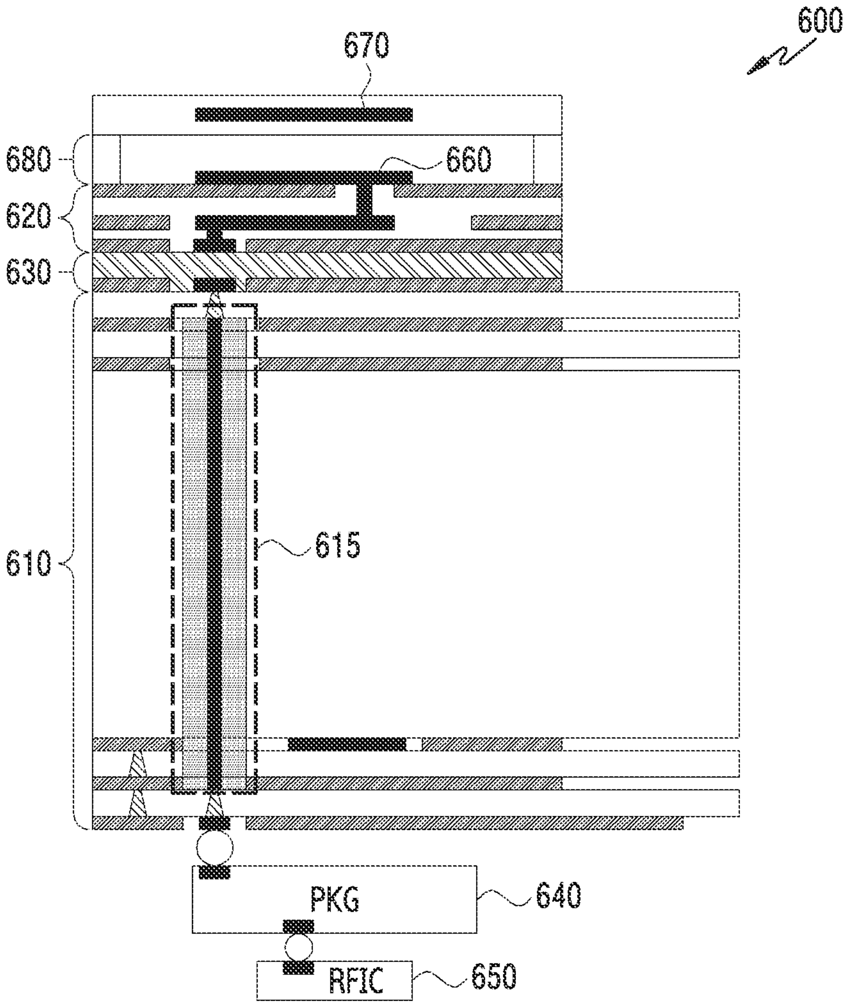
FIG. 6A illustrates a structure of an antenna device including an external structure according to an embodiment of the disclosure.

FIG. 6A illustrates a structure of an antenna device including an external structure according to an embodiment of the disclosure.

Referring to FIG. 6A, an antenna device 600 shows a structure which further includes an external structure in the antenna device 400 of FIG. 4 and may include a first PCB 610, a second PCB 620, a connection unit 630, a package board (PKG) 640, and an RFIC 650. Accordingly, a description of the antenna device 600 of FIG. 6A may be applied in the same manner as the description of the antenna device 400 of FIG. 4, and a description of the same content will be omitted.

Referring to FIG. 6A, the antenna device 600 may further include an additional PCB including a second conductive member 670, and a support structure 680. According to an embodiment of the disclosure, the support structure 680 may be disposed so as not to interfere with RF signal radiation from a first conductive member 660 and the second conductive member 670. For example, the arrangement of the support structure 680 may be determined based on the arrangement of the first conductive member 660 and the second conductive member 670. According to an embodiment of the disclosure, in the antenna device 600, an air layer may be formed between the first conductive member 660 and the second conductive member 670 by the support structure 680. Since an air layer is formed, the first conductive member 660 and the second conductive member 670 may be spaced apart from each other, and a radiation efficiency of the antenna device 600 may be improved. For example, the second conductive member 670 is added as being spaced apart from the first conductive member 660, whereby a bandwidth of an RF signal radiated from the antenna device 600 may be expanded.

Figure 6B:
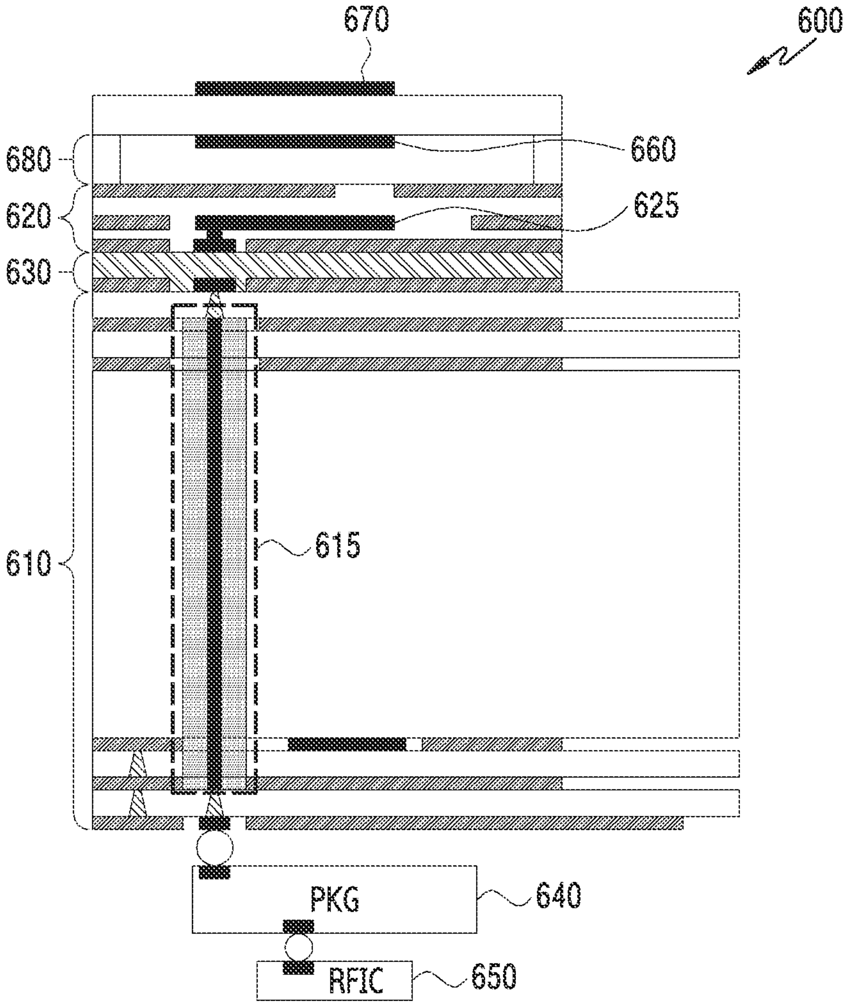
FIG. 6B illustrates a structure of an antenna device including an external structure according to an embodiment of the disclosure.

FIG. 6B illustrates an antenna device including an external structure according to an embodiment of the disclosure.

Referring to FIG. 6B, the antenna device 600 shows a structure which further includes an external structure in the antenna device 500 of FIG. 5. Accordingly, a description of the antenna device 600 of FIG. 6B may be applied in the same manner as the description of the antenna device 500 of FIG. 4, and a description of the same content will be omitted.

Referring to FIG. 6B, the antenna device 600 may further include an additional PCB on which a first conductive member 660 and a second conductive member 670 are disposed, and a support structure 680. According to an embodiment of the disclosure, the support structure 680 may be disposed so as not to interfere with RF signal radiation from the first conductive member 660 and the second conductive member 670. For example, the arrangement of the support structure 680 may be determined based on the arrangement of the first conductive member 660 and the second conductive member 670. According to an embodiment of the disclosure, in the antenna device 600, an air layer may be formed between the additional PCB and a second PCB 620 by the support structure 680. When the air layer is formed, an RF routing layer 625 of the second PCB 620 may indirectly feed (e.g., coupling feed, or the like) the first conductive member 660. According to an embodiment of the disclosure, the first conductive member 660 may be disposed to be spaced apart from the second conductive member 670 by the additional PCB. For example, the first conductive member 660 may be disposed on a first surface of the additional PCB, and the second conductive member 670 may be disposed on a second surface of the additional PCB. According to this, the first conductive member 660 and the second conductive member 670 may be spaced apart from each other, and a radiation efficiency of the antenna device 600 may be improved. For example, the second conductive member 670 is added as being spaced apart from the first conductive member 660, whereby a bandwidth of an RF signal radiated from the antenna device 600 may be expanded.

Hereinafter, in FIG. 7 and FIG. 8, a description will be made for various examples of a processing method of a support structure of an antenna device and a structure of a connection unit.

Figure 7:
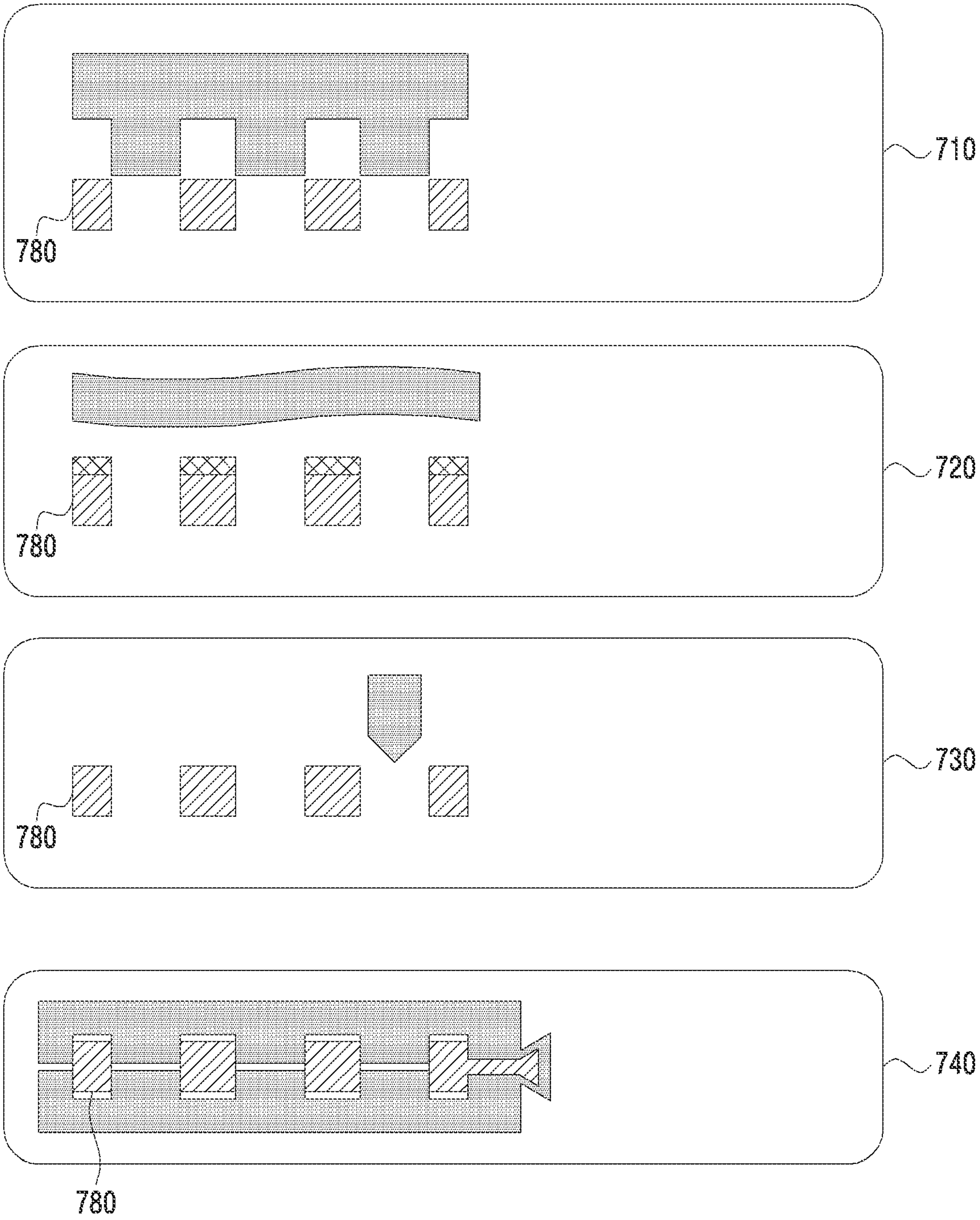
FIG. 7 illustrates a processing method of a support structure according to an embodiment of the disclosure.

FIG. 7 illustrates a method for processing a support structure according to an embodiment of the disclosure.

Referring to FIG. 7, a support structure 780 may be understood identically with the support structure 380 of FIGS. 3A, 3B, 3C, 3D, 3E, 3F, 3G. For description convenience's sake, FIG. 7 illustrates the support structure 780 including four support structures as an example.

According to an embodiment of the disclosure, the support structure 780 may be formed of a conductive or non-conductive material. For example, the support structure 780 may be formed of a metal, a (non) conductive silicone, a (non) conductive fiber, a (non) conductive adhesive, a fiber reinforced plastic (FRP), a carbon fiber reinforced plastic (CFRP), a plastic, or the like.

Referring to FIG. 7, four processes for forming the support structure 780 made of the above-described material are illustrated. However, the disclosure is not limited thereto, and may be understood to include processes that may be understood identically with the following processes.

Referring to process 710, the support structure 780 may be formed by a press mold process. For example, the support structure 780 may be formed through a press machine in the form of embossing or intaglio at regular intervals.

Referring to process 720, the support structure 780 may be formed by an etching process. For example, the support structure 780 may be formed by performing masking along the shape of the support structure 780 and then etching out the remaining portion except for the support structure 780 through a chemical method (e.g., a solution, gas, or the like) or a physical method.

Referring to process 730, the support structure 780 may be formed by a drilling process. For example, the support structure 780 may be formed by a computer numerical control (CNC) drilling process. In addition, the support structure 780 may be formed by removing a portion other than the support structure 780 by a laser.

Referring to process 740, the support structure 780 may be formed by an injection molding process. For example, the support structure 780 may be formed by injecting a material, such as plastic into a frame having the shape of the support structure 780.

Figure 8:
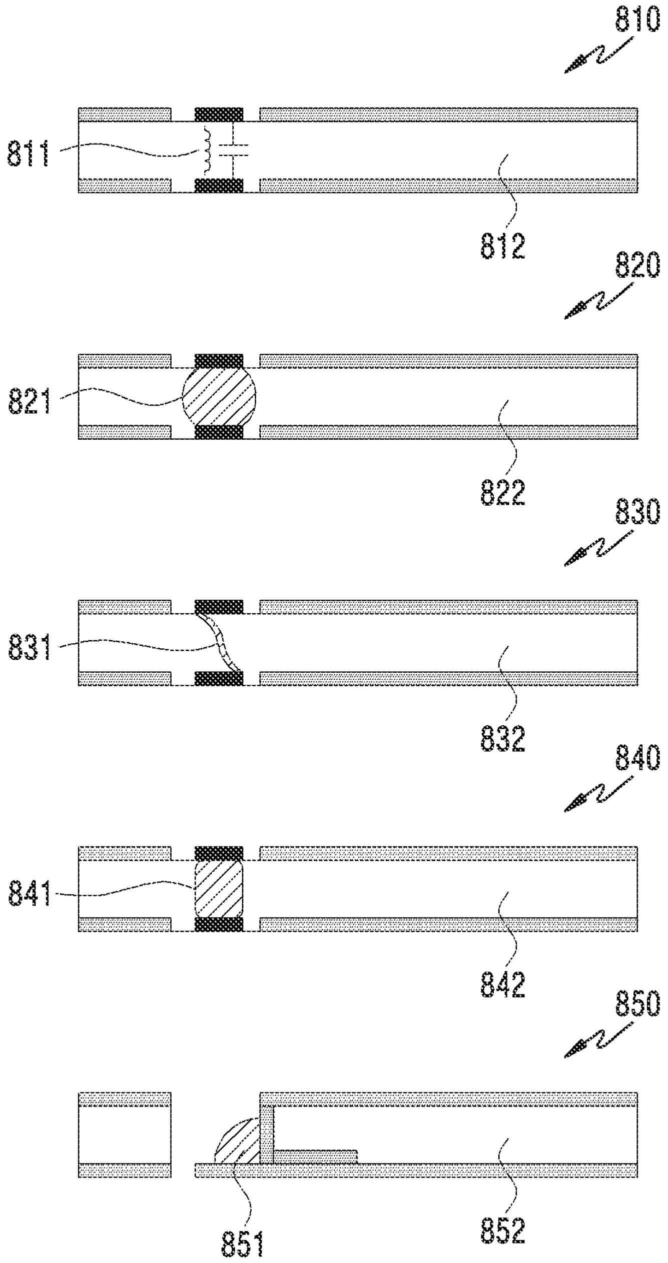
FIG. 8 illustrates a structure of a connection unit according to an embodiment of the disclosure.

FIG. 8 illustrates a structure of a connection unit according to an embodiment of the disclosure.

Referring to FIG. 8, connection units 810, 820, 830, 840, and 850 of FIG. 8 may be understood identically with the connection unit 330 of FIGS. 3A to 3G. For description convenience's sake, in FIG. 8, a description will be made assuming a connection unit disposed between a second surface of a first PCB and a first surface of a second PCB.

Referring to FIG. 8, the connection unit 810 may be formed to have a coupler structure. For example, the first PCB may be electrically connected to the second PCB by the connection unit 810 having the coupler structure. According to an embodiment of the disclosure, the connection unit 810 may include a capacitor and/or an inductor 811 by coupling. In addition, a region 812 excluding the capacitor and/or inductor 811 of the connection unit 810 may be filled with a bonding sheet or an adhesive. In other words, by the connection unit 810 having the coupler structure, the first PCB may be separated from the second PCB, but may be electrically connected.

According to an embodiment of the disclosure, the connection units 820, 830, 840, and 850 may be formed to have a connector structure. For example, the connection unit 820 may include a ball grid array (BGA) 821. In addition, a region 822 excluding the BGA 821 of the connection unit 820 may be formed by air or a molding compound. For another example, the connection unit 830 may include a land grid array (LGA) 831. In addition, a region 832 excluding the LGA 831 of the connection unit 830 may be formed by air or a molding compound. For further example, the connection unit 840 may include a conductive paste 841 (e.g., silver, a material in which the outside of copper is coated with silver, or the like). In addition, a region 842 excluding the conductive paste 841 of the connection unit 840 may be formed by a prepreg. For yet another example, the connection unit 850 may include a surface mount device (SMD) 851 (e.g., a soldering paste). In addition, a connection member 852 soldered by the SMD 851 of the connection unit 850 may be further included. As described above, by the connection units 820, 830, 840, and 850 having the connector structure, the first PCB may be separated from the second PCB, but may be electrically connected.

Figure 9:
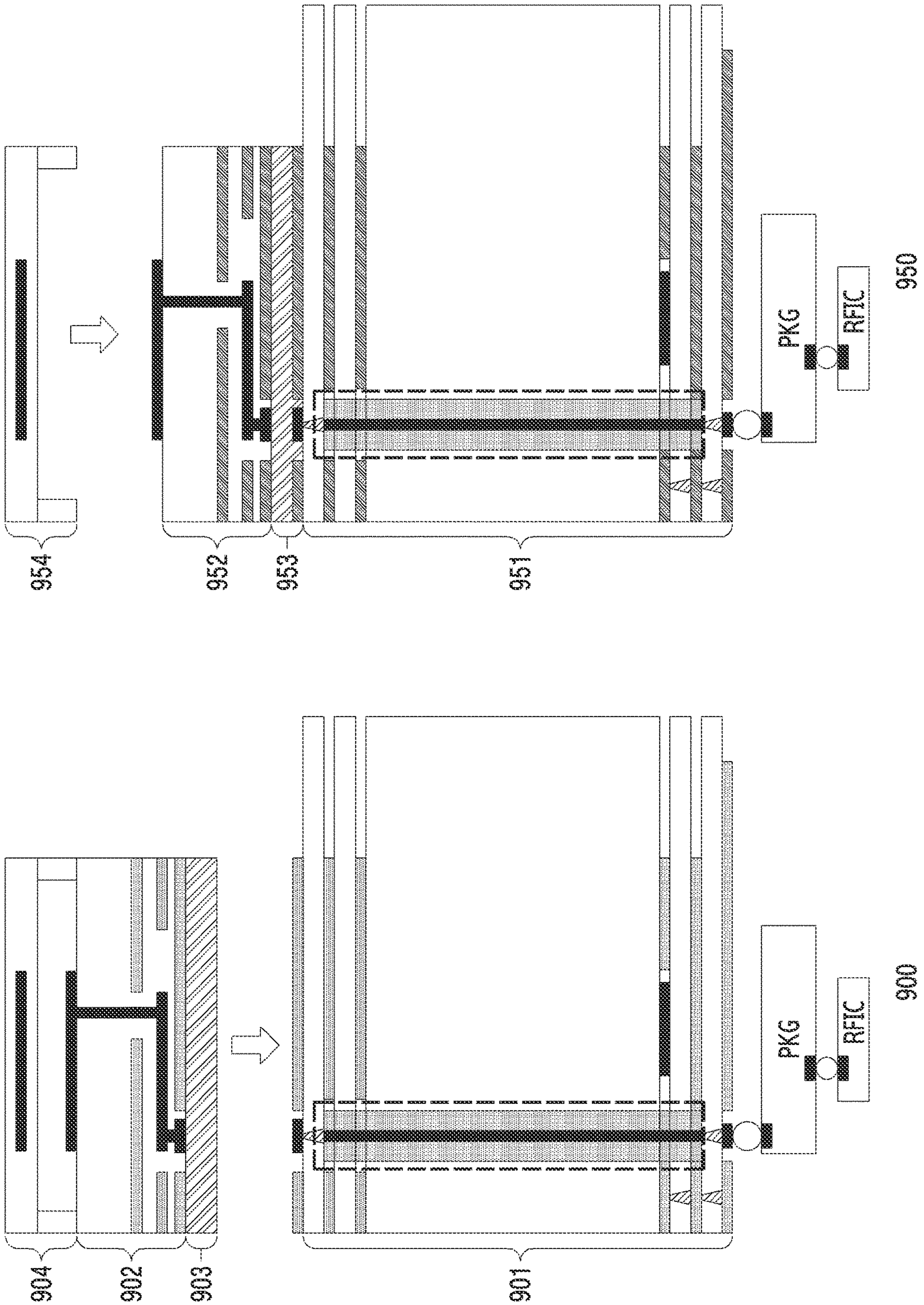
FIG. 9 illustrates a processing method based on a structure of an antenna device according to an embodiment of the disclosure.

FIG. 9 illustrates a processing method based on the structure of an antenna device according to an embodiment of the disclosure.

Referring to FIG. 9, the antenna device 600 of FIG. 6A is explained as an example for description convenience's sake, but it is obvious that the antenna device 600 of FIG. 6B may also be applied.

FIG. 9 illustrates process 900 and process 950 based on the structure of the antenna device according to an embodiment of the disclosure. According to an embodiment of the disclosure, in process 900, the antenna device may be formed, by first coupling a connection unit 903, a second PCB 902, and an external structure 904 and then coupling to a first PCB 901. According to another embodiment of the disclosure, in process 950, the antenna device may be formed, by first coupling a first PCB 951, a connection unit 953, and a second PCB 952 and then coupling an external structure 954.

Processes 900 and 950 explained above may be determined according to a structure connected to the first PCBs 901 and 951 or physical properties of the connection units 903 and 953. For example, in the connection unit 810 of FIG. 8, when the region 812 is filled with an adhesive, the antenna device may be formed by process 900. Unlike this, when the region 812 is filled with a bonding sheet, the antenna device may be formed by process 950. For another example, when a height of the structure connected to the first PCB is relatively high, the antenna device may be formed by a process of, as in process 950, connecting some structures (e.g., the connection unit 953 and the second PCB 952) to the first PCB 951 and then connecting the external structure 954. Unlike this, when the height of the structure connected to the first PCB is relatively low, the antenna device may be formed by a process of, as in process 900, first coupling the structure (e.g., the connection unit 903, the second PCB 902, and the external structure 904) connected to the first PCB 901 and then connecting with the first PCB 901.

Referring to FIGS. 1 to 9, the structure of an antenna device including a detachable PCB of an embodiment of the disclosure may have a difference with the relevant art, by including a first PCB connected to an RFIC, a second PCB connected to an antenna element unit, and a connection unit separating them. For example, the PCB connected to the RFIC and the PCB including antenna elements are separated from each other by a connection unit, thereby presenting a radiation efficiency and a design advantage, whereas the existing structure may substantially include one PCB, and connect one surface of one PCB to an RFIC, and connect the other surface to antenna elements, thereby reducing a radiation efficiency, and making design change difficult.

For another example, in connecting a detached PCB, unlike the structure of the related art connecting directly or connecting by a ground layer, the structure of an antenna device including the detachable PCB of an embodiment of the disclosure may connect by a connection unit electrically connecting this, thereby minimizing an amount of lamination of the entire laminated structure and minimizing a transmission loss, and have an advantage in that a design change of a detached portion (e.g., an antenna module) is easy.

For further example, in forming a feeding structure, the existing structure may feed not separating vertical and horizontal structures, or passing a plurality of laminated structures, and accordingly to this, the complexity of circuits constituting a PCB may be increased. Therefore, it may be difficult to change the structure of an antenna device or to correct some malfunctions when the malfunctions occur. Unlike this, the structure of an antenna device including a detachable PCB of an embodiment of the disclosure may divide a vertical feeding structure (e.g., a feeding structure of a first PCB) and a horizontal feeding structure (e.g., an RF routing layer of a second PCB) and form an antenna module including the horizontal feeding structure, whereby, since the number of lamination is relatively small, a transmission efficiency of an RF signal may be increased, and a design change may be easily made by a detachable antenna module.

Referring to FIGS. 1 to 9, compared to the existing structure of an antenna device including an integrated PCB, the structure of an antenna device including a detachable PCB of an embodiment of the disclosure may minimize a transmission loss while an RF signal processed by a radio frequency integrated circuit (RFIC) is transmitted to an antenna radiator. The existing structure of the antenna device including the integrated PCB has to include a plurality of RF components as transmitting and receiving an mmWave signal. In order to mount the plurality of RF components, the integrated PCB is formed to have a plurality of layers (e.g., 18 layers). For example, a hybrid process PCB using a high density interconnection (HDI) being a high density multilayer substrate used in a small electronic device, and a multi-layer board (MLB) including a plurality of printed circuit boards (PCBs) may be used. However, as the number of layers laminated on one PCB is increased, a transmission loss during the transmission from the RFIC to the antenna radiator may increase. Unlike this, the structure of the antenna device including the detachable PCB of an embodiment of the disclosure may separate into a first PCB connected to an RFIC and a second PCB connected to an antenna, thereby reducing the total number of laminated layers and thus minimizing a transmission loss. In addition, the transmission loss may be decreased by vertically forming a feeding structure included in the first PCB and horizontally forming an RF routing layer included in the second PCB. Further to this, antenna radiation efficiency (98% or more) may be increased by reducing a height of the second PCB (i.e., by reducing the number of lamination) in that the height of the second PCB may have a great influence on antenna radiation efficiency.

The structure of an antenna device including a detachable PCB of an embodiment of the disclosure enables efficient design compared to the existing structure of an antenna device including an integrated PCB. The existing structure of the antenna device including the integrated PCB is difficult to change the design of the PCB including a large number of layers due to a complicated configuration, and as the number of layers increases, a production cost may increase exponentially. Unlike this, when some devices are changed, the detachable PCB of an embodiment of the disclosure may facilitate design change by changing only a corresponding portion (e.g., the first PCB or the second PCB). More particularly, the structure of the antenna device including the detachable PCB of an embodiment of the disclosure may include an antenna module which includes a second PCB and at least one antenna element, and when a change in some antenna elements is necessary, easy replacement may be made by changing only an antenna module corresponding to the some antenna elements. In addition, since the detachable PCB of the disclosure has a lower number of lamination compared to the existing integrated PCB, a production cost may be reduced.

Figure 10:
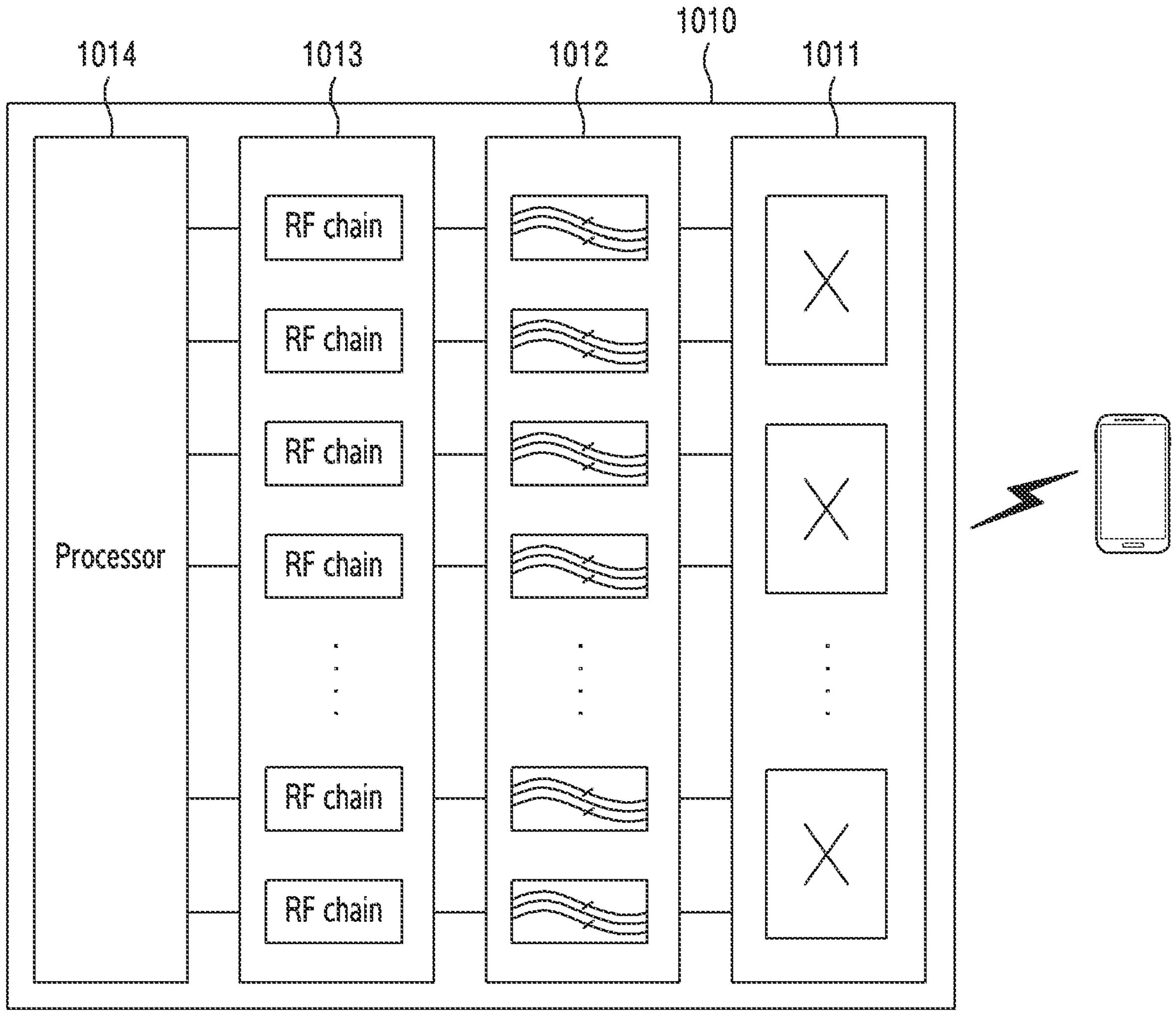
FIG. 10 illustrates a functional construction of an electronic device according to an embodiment of the disclosure.

FIG. 10 illustrates a functional construction of an electronic device according to an embodiment of the disclosure.

Referring to FIG. 10, the functional construction of an electronic device 1010 is illustrated. The electronic device 1010 may include an antenna unit 1011, a filter unit 1012, a radio frequency (RF) processing unit 1013, and a control unit 1014.

The antenna unit 1011 may include a plurality of antennas. The antenna performs functions for transmitting and/or receiving signals through a wireless channel. The antenna may include a radiator which is formed of a conductor or conductive pattern formed on a substrate (e.g., a PCB). The antenna may radiate an up-converted signal on a wireless channel or acquire a signal radiated by another device. Each antenna may be referred to as an antenna element or an antenna device. In some embodiments of the disclosure, the antenna unit 1011 may include an antenna array (e.g., a sub array) in which a plurality of antenna elements form an array. The antenna unit 1011 may be electrically connected to the filter unit 1012 through RF signal lines. The antenna unit 1011 may be mounted on a PCB including the plurality of antenna elements. The PCB may include a plurality of RF signal lines connecting the respective antenna elements and a filter of the filter unit 1012. These RF signal lines may be referred to as a feeding network. The antenna unit 1011 may present a received signal to the filter unit 1012 or may radiate a signal presented from the filter unit 1012 into the air. An antenna having a structure of an embodiment of the disclosure may be included in the antenna unit 1011.

The antenna unit 1011 of various embodiments may include at least one antenna module having a dual polarization antenna. The dual polarization antenna may be, for one example, a cross-pol (x-pol) antenna. The dual polarization antenna may include two antenna elements corresponding to different polarizations. For example, the dual polarization antenna may include a first antenna element having a polarization of +45° and a second antenna element having a polarization of −45°. Undoubtedly, the polarization may be formed of orthogonal other polarizations besides +45° and −45°. Each antenna element may be connected to a feeding line, and may be electrically connected to the filter unit 1012, the RF processing unit 1013, and the control unit 1014 described later.

According to an embodiment of the disclosure, the dual polarization antenna may be a patch antenna (or a microstrip antenna). Since the dual polarization antenna has a shape of the patch antenna, the dual polarization antenna may be easily implemented and integrated into an array antenna. Two signals having different polarizations may be inputted to each antenna port. Each antenna port corresponds to an antenna element. For high efficiency, it is required to optimize a relationship with a co-pol characteristic, and a cross-pol characteristic, between the two signals having the different polarizations. In the dual polarization antenna, the co-pol characteristic indicates a characteristic of a specific polarization component, and the cross-pol characteristic indicates a characteristic of a polarization component different from the specific polarization component.

An antenna (e.g., an antenna element, a sub-array, and/or an antenna array) of an antenna device including a detachable PCB of an embodiment of the disclosure may be included in the antenna unit 1011. For example, a first conductive member or the first conductive member and a second conductive member of the antenna device of an embodiment of the disclosure may mean an antenna element, and may be included in the antenna unit 1011 of FIG. 10.

The filter unit 1012 may perform filtering in order to transmit a signal of a desired frequency. The filter unit 1012 may perform a function for selectively identifying a frequency by forming a resonance. In some embodiments of the disclosure, the filter unit 1012 may form the resonance through a cavity structurally including a dielectric material. In addition, in some embodiments of the disclosure, the filter unit 1012 may form the resonance through devices which form inductance or capacitance. Moreover, in some embodiments of the disclosure, the filter unit 1012 may include an elastic filter, such as a bulk acoustic wave (BAW) filter or a surface acoustic wave (SAW) filter. The filter unit 1012 may include at least one of a band pass filter, a low pass filter, a high pass filter, and a band reject filter. For example, the filter unit 1012 may include RF circuits for acquiring a signal of a frequency band for transmission or a frequency band for reception. The filter unit 1012 of various embodiments may electrically connect the antenna unit 1011 and the RF processing unit 1013.

The RF processing unit 1013 may include a plurality of RF paths. The RF path may be the unit of a path through which a signal received through an antenna or a signal radiated through the antenna passes. At least one RF path may be referred to as an RF chain. The RF chain may include a plurality of RF devices. The RF devices may include an amplifier, a mixer, an oscillator, a DAC, an ADC, and the like. For example, the RF processing unit 1013 may include an up converter up-converting a digital transmission signal of a base band to a transmission frequency, and a digital-to-analog converter (DAC) converting the up-converted digital transmission signal into an analog RF transmission signal. The up converter and the DAC form a part of a transmission path. The transmission path may further include a power amplifier (PA) or a coupler (or a combiner). In addition, for example, the RF processing unit 1013 may include an analog-to-digital converter (ADC) converting an analog RF reception signal into a digital reception signal, and a down converter converting a digital reception signal into a baseband digital reception signal. The ADC and the down converter form a part of a reception path. The reception path may further include a low-noise amplifier (LNA) or a coupler (or a divider). RF components of the RF processing unit may be implemented on a PCB. The antennas and the RF components of the RF processing unit may be implemented on the PCB, and filters may be repeatedly fastened between a PCB and a PCB to form a plurality of layers.

A radio frequency integrated circuit (RFIC), and a package board (PKG), of an antenna device including a detachable PCB of an embodiment of the disclosure may be included in the RF processing unit 1013 of FIG. 10. For example, the RF processing unit 1013 is an RF device for mmWave and may include the radio frequency integrated circuit (RFIC). As described above in the disclosure, the RFIC may be formed of an RFIC chip coupled to the package board and be coupled to the first PCB, or the RFIC may be directly coupled by the first PCB.

The control unit 1014 may control overall operations of the electronic device 1010. The control unit 1014 may include various modules for performing communication. The control unit 1014 may include at least one processor, such as a modem. The control unit 1014 may include modules for digital signal processing. For example, the control unit 1014 may include a modem. At data transmission, the control unit 1014 provides complex symbols by encoding and modulating a transmission bit stream. In addition, for example, at data reception, the control unit 1014 restores a reception bit stream by demodulating and decoding a baseband signal. The control unit 1014 may perform functions of a protocol stack required in a communication standard.

In FIG. 10, a functional construction of the electronic device 1010 has been described as equipment to which the device of various embodiments of the disclosure may be applied. However, an example shown in FIG. 10 is only a construction of a device for a structure of various embodiments of the disclosure described through FIGS. 1 to 9, and embodiments of the disclosure are not limited to the components of the equipment shown in FIG. 10. Accordingly, a structure itself of the antenna device including the detachable PCB and an electronic device including the structure may also be understood as embodiments of the disclosure.

An antenna device of an embodiment of the disclosure described above may include a first printed circuit board (PCB), a second PCB for a plurality of antenna elements, and a radio frequency integrated circuit (RFIC) coupled through a first surface of the first PCB. The second PCB may include an RF routing layer including RF lines for the respective plurality of antenna elements. The first PCB may include a feeding structure for connecting the RF routing layer and the RFIC. The second PCB may be electrically connected to a second surface of the first PCB opposite to the first surface of the first PCB, through a first surface of the second PCB. The second PCB may be coupled to the plurality of antenna elements through a second surface of the second PCB opposite the first surface of the second PCB.

In an embodiment of the disclosure, the antenna device may further include first conductive members disposed on the second surface of the second PCB. The first conductive members may be electrically connected corresponding to the respective RF lines. The first conductive members may be radiators of the plurality of antenna elements.

In an embodiment of the disclosure, the antenna device may further include a support structure and a third PCB, which are disposed on the second surface of the second PCB. The third PCB may be disposed as being spaced apart from the second PCB through an air layer formed by the support structure. The third PCB may include second conductive members disposed to correspond to the first conductive members. The second conductive members may be the radiators of the plurality of antenna elements.

In an embodiment of the disclosure, the antenna device may further include a support structure and a third PCB, which are disposed on the second surface of the second PCB. The third PCB may be disposed as being spaced apart from the second PCB through an air layer formed by the support structure. The third PCB may include first conductive members and second conductive members disposed to correspond to the first conductive members. The first conductive members may be electrically connected corresponding to the respective RF lines. The first conductive members and the second conductive members may be radiators of the plurality of antenna elements.

In an embodiment of the disclosure, the first PCB and the second PCB may be electrically connected by a coupler.

In an embodiment of the disclosure, the first PCB and the second PCB may be electrically connected by a ball grid array (BGA).

In an embodiment of the disclosure, the first PCB and the second PCB may be electrically connected by a land grid array (LGA).

In an embodiment of the disclosure, the first PCB and the second PCB may be electrically connected by a conductive paste.

In an embodiment of the disclosure, the first PCB and the second PCB may be electrically connected through a surface mount device (SMD).

In an embodiment of the disclosure, the feeding structure of the first PCB may include a plurality of feeding lines for the RF lines of the second PCB.

A base station of an embodiment of the disclosure described above may include a plurality of antenna arrays, a plurality of radio frequency integrated circuits (RFICs) corresponding to the plurality of antenna arrays, and a plurality of antenna devices connecting the plurality of antenna arrays and the plurality of RFICs. At least one antenna device among the plurality of antenna devices may include a first printed circuit board (PCB), a second PCB for a plurality of antenna elements, and a first RFIC coupled through a first surface of the first PCB. The second PCB may include an RF routing layer including RF lines for the respective plurality of antenna elements. The first PCB may include a feeding structure for connecting the RF routing layer and the RFIC. The second PCB may be electrically connected to a second surface of the first PCB opposite to the first surface of the first PCB, through a first surface of the second PCB. The second PCB may be coupled to the plurality of antenna elements through a second surface of the second PCB opposite to the first surface of the second PCB. The plurality of antenna elements may be included in a first antenna array among the plurality of antenna arrays. The first RFIC may be included in the plurality of RFICs.

In an embodiment of the disclosure, the at least one antenna device may further include first conductive members disposed on the second surface of the second PCB. The first conductive members may be electrically connected corresponding to the respective RF lines. The first conductive members may be radiators of the plurality of antenna elements.

In an embodiment of the disclosure, the at least one antenna device may further include a support structure and a third PCB, which are disposed on the second surface of the second PCB. The third PCB may be disposed as being spaced apart from the second PCB through an air layer formed by the support structure. The third PCB may include second conductive members disposed to correspond to the first conductive members. The second conductive members may be the radiators of the plurality of antenna elements.

In an embodiment of the disclosure, the at least one antenna device may further include a support structure and a third PCB, which are disposed on the second surface of the second PCB. The third PCB may be disposed as being spaced apart from the second PCB through an air layer formed by the support structure. The third PCB may include first conductive members and second conductive members disposed to correspond to the first conductive members. The first conductive members may be electrically connected corresponding to the respective RF lines. The first conductive members and the second conductive members may be radiators of the plurality of antenna elements.

In an embodiment of the disclosure, when a first region is between the first primary inductor and the secondary inductor, and a second region is between the second primary inductor and the secondary inductor, a capacitance of the first capacitor may be related to a dielectric constant of the first region, and a capacitance of the second capacitor may be related to a dielectric constant of the second region.

In an embodiment of the disclosure, the first PCB and the second PCB may be electrically connected by a coupler.

In an embodiment of the disclosure, the first PCB and the second PCB may be electrically connected by a ball grid array (BGA).

In an embodiment of the disclosure, the first PCB and the second PCB may be electrically connected by a land grid array (LGA).

In an embodiment of the disclosure, the first PCB and the second PCB may be electrically connected by a conductive paste.

In an embodiment of the disclosure, the first PCB and the second PCB may be electrically connected through a surface mount device (SMD).

In an embodiment of the disclosure, the feeding structure of the first PCB may include a plurality of feeding lines for the RF lines of the second PCB.

Methods of embodiments described in claims or specification of the disclosure may be implemented in the form of hardware, software, or a combination of hardware and software.

When implemented in software, a computer-readable storage medium storing one or more programs (i.e., software modules) may be presented. One or more programs stored in the computer-readable storage medium are configured to be executable by one or more processors in an electronic device. One or more programs include instructions for enabling the electronic device to execute methods of embodiments described in claims or specification of the disclosure.

These programs (i.e., software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), or an optical storage device of other forms, and/or a magnetic cassette. Alternatively, it may be stored in a memory including a combination of some or all thereof. In addition, each configuration memory may be included in plurality as well.

The program may be stored in an attachable storage device that may be accessed through a communication network, such as the Internet, an intranet, a local area network (LAN), a wide area network (WAN), or a storage area network (SAN), or a communication network consisting of a combination thereof. This storage device may be connected to a device performing an embodiment of the disclosure through an external port. In addition, a separate storage device on the communication network may be connected to a device implementing an embodiment of the disclosure as well.

In the aforementioned concrete embodiments of the disclosure, components included in the disclosure have been expressed in the singular or plural according to concrete embodiments presented. However, the singular or plural expression is selected appropriately for context presented for description convenience's sake, and the disclosure is not limited to the singular or plural component, and even if the component is expressed in the plural, it is including the singular, or even if the component is expressed in the singular, it may be including the plural.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An antenna device comprising:

a plurality of first antenna elements;

a first printed circuit board (PCB) including a first face and a second face;

a second PCB for supporting the plurality of first antenna elements, wherein the second PCB includes a third face facing the second face;

a connection portion disposed between the first PCB and the second PCB; and a radio frequency integrated circuit (RFIC) disposed on the first face of the first PCB, wherein the first PCB comprises a feeding structure electrically connected to the RFIC and formed from the first face of the first PCB to the second face of the first PCB, wherein the second PCB comprises feeding lines formed from the plurality of first antenna elements to the third face, and a routing layer comprising radio frequency (RF) lines for the plurality of first antenna elements, and wherein the feeding structure is spaced apart from the feeding lines by the connection portion, and is capacitively connected to the feeding lines.

2. The antenna device of claim 1, further comprising:

a support structure disposed on a fourth face of the second PCB which is opposite to the third face of the second PCB facing the second face of the first PCB;

a third PCB; and a plurality of second antenna elements disposed on the third PCB to correspond to the plurality of first antenna elements, wherein the third PCB is disposed as being spaced apart from the second PCB through an air layer formed by the support structure.

3. The antenna device of claim 1, further comprising:

a support structure disposed on a fourth face of the second PCB which is opposite to the third face of the second PCB facing the second face of the first PCB;

a third PCB; and a plurality of second antenna elements, wherein the third PCB is disposed as being spaced apart from the second PCB through an air layer formed by the support structure, and wherein the plurality of first antenna elements are disposed on a fifth face of the third PCB and the plurality of second antenna elements are disposed on a sixth face of the third PCB.

4. The antenna device of claim 1, further comprising:

a package board disposed between the first PCB and the RFIC, wherein the RFIC is coupled to the package board to be disposed on the first face of the first PCB.

5. The antenna device of claim 1, wherein the first PCB and the second PCB are electrically connected by a ball grid array (BGA).

6. The antenna device of claim 1, wherein the first PCB and the second PCB are electrically connected by a land grid array (LGA).

7. The antenna device of claim 1, wherein the first PCB and the second PCB are electrically connected by a conductive paste.

8. The antenna device of claim 1, wherein the first PCB and the second PCB are electrically connected through a surface mount device (SMD).

9. The antenna device of claim 1, wherein the feeding structure of the first PCB comprises a plurality of feeding lines for the RF lines of the second PCB.

10. A base station comprising:

a plurality of antenna arrays;

a plurality of radio frequency integrated circuits (RFICs) corresponding to the plurality of antenna arrays; and a plurality of antenna devices connecting the plurality of antenna arrays and the plurality of RFICs, wherein at least one antenna device among the plurality of antenna devices comprises a first printed circuit board (PCB), a second PCB for a plurality of antenna elements, and a first RFIC coupled through a first surface of the first PCB, wherein the second PCB comprises a radio frequency (RF) routing layer comprising RF lines for the respective plurality of antenna elements, wherein the first PCB comprises a feeding structure for connecting the RF routing layer and the first RFIC, wherein the second PCB is electrically connected to a second surface of the first PCB opposite to the first surface of the first PCB, through a first surface of the second PCB, wherein the second PCB is coupled to the plurality of antenna elements through a second surface of the second PCB opposite to the first surface of the second PCB, wherein the plurality of antenna elements are comprised in a first antenna array among the plurality of antenna arrays, and wherein the first RFIC is comprised in the plurality of RFICs.

11. The base station of claim 10, wherein the at least one antenna device further comprises first conductive members disposed on the second surface of the second PCB, wherein the first conductive members are electrically connected corresponding to the respective RF lines, and wherein the first conductive members correspond to radiators of the plurality of antenna elements.

12. The base station of claim 11, wherein the at least one antenna device further comprises a support structure and a third PCB, which are disposed on the second surface of the second PCB, wherein the third PCB is disposed as being spaced apart from the second PCB through an air layer formed by the support structure, wherein the third PCB comprises second conductive members disposed to correspond to the first conductive members, and wherein the second conductive members correspond to the radiators of the plurality of antenna elements.

13. The base station of claim 10, wherein the at least one antenna device further comprises a support structure and a third PCB, which are disposed on the second surface of the second PCB, wherein the third PCB is disposed as being spaced apart from the second PCB through an air layer formed by the support structure, wherein the third PCB comprises first conductive members and second conductive members disposed to correspond to the first conductive members, wherein the first conductive members are electrically connected corresponding to the respective RF lines, and wherein the first conductive members and the second conductive members correspond to radiators of the plurality of antenna elements.

14. The base station of claim 10, wherein the first PCB and the second PCB are electrically connected by a coupler.

15. The base station of claim 10, wherein the first PCB and the second PCB are electrically connected by a ball grid array (BGA).

16. The base station of claim 10, wherein the first PCB and the second PCB are electrically connected by a land grid array (LGA).

17. The base station of claim 10, wherein the first PCB and the second PCB are electrically connected by a conductive paste.

18. The base station of claim 10, wherein the first PCB and the second PCB are electrically connected through a surface mount device (SMD).

19. The base station of claim 10, wherein the feeding structure of the first PCB comprises a plurality of feeding lines for the RF lines of the second PCB.

* * * * *